(12) United States Patent
Zhong et al.

(10) Patent No.: US 8,468,255 B2
(45) Date of Patent: Jun. 18, 2013

(54) DATA CARD AND METHOD FOR INTERNET ACCESS OF DATA CARD

(75) Inventors: Zhen Zhong, Shenzhen (CN); Guiying Xue, Shenzhen (CN); Yuxin Nie, Shenzhen (CN); Wei Chen, Shenzhen (CN); Bin Li, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/340,268

(22) Filed: Dec. 29, 2011

(65) Prior Publication Data

US 2012/0209950 A1 Aug. 16, 2012

(30) Foreign Application Priority Data

Feb. 12, 2011 (CN) .......................... 2011 1 0036920

(51) Int. Cl.
*G06F 15/16* (2006.01)
(52) U.S. Cl.
USPC ............................ 709/227; 709/219; 709/223
(58) Field of Classification Search
USPC .................................. 709/217–219, 227, 223
See application file for complete search history.

(56) References Cited

U.S. PATENT DOCUMENTS

| | | | | |
|---|---|---|---|---|
| 6,792,464 | B2* | 9/2004 | Hendrick | 709/227 |
| 7,191,234 | B2* | 3/2007 | Farrugia et al. | 709/227 |
| 7,650,419 | B2* | 1/2010 | Curtis | 709/229 |
| 2001/0054112 | A1* | 12/2001 | Nobakht et al. | 709/229 |
| 2004/0170259 | A1* | 9/2004 | Park | 370/352 |
| 2004/0203296 | A1* | 10/2004 | Moreton et al. | 439/894 |
| 2006/0036753 | A1* | 2/2006 | Curtis | 709/229 |
| 2007/0235524 | A1* | 10/2007 | Little | 235/380 |
| 2008/0194229 | A1* | 8/2008 | Pan | 455/406 |
| 2008/0260154 | A1* | 10/2008 | Smierschalski et al. | 380/270 |
| 2008/0261654 | A1* | 10/2008 | Sakeen | 455/558 |
| 2012/0084430 | A1* | 4/2012 | Lu | 709/224 |
| 2012/0102238 | A1* | 4/2012 | Wei | 710/13 |
| 2012/0124489 | A1* | 5/2012 | Zhao et al. | 715/760 |

FOREIGN PATENT DOCUMENTS

| | | | |
|---|---|---|---|
| CN | 1015888378 | * | 6/2009 |
| CN | 101588378 | A | 11/2009 |
| CN | 101662838 | A | 3/2010 |
| CN | 101826967 | A | 9/2010 |
| CN | 101950252 | A | 1/2011 |

(Continued)

OTHER PUBLICATIONS

1st Office Action in corresponding Chinese Application No. 2011100369205 (Dec. 9, 2011).
Extended European Search Report in corresponding European Patent Application No. 11195150.5 (May 16, 2012).

*Primary Examiner* — Philip B Tran
(74) *Attorney, Agent, or Firm* — Leydig, Voit & Mayer, Ltd

(57) ABSTRACT

The present invention provides a data card and a method for Internet access by the data card. The method for Internet access by the data card includes: after the data card is connected to a host, mapping the data card into an Internet access device by using an Ethernet interface protocol; obtaining, by the data card, dial-up information; dialing, by using the dial-up information, to request to connect to a network; and performing, by the Internet access device, communication between the host and the network. By using the technical solutions provided by embodiments of the present invention, fast Internet access may be implemented without installing a driver.

10 Claims, 19 Drawing Sheets

FOREIGN PATENT DOCUMENTS

| | | |
|---|---|---|
| WO | WO2009/006904 A1 * | 1/2009 |
| WO | WO 2010037315 A1 | 4/2010 |
| WO | WO 2010142065 A1 | 12/2010 |
| WO | WO 2011003257 A1 | 1/2011 |

* cited by examiner

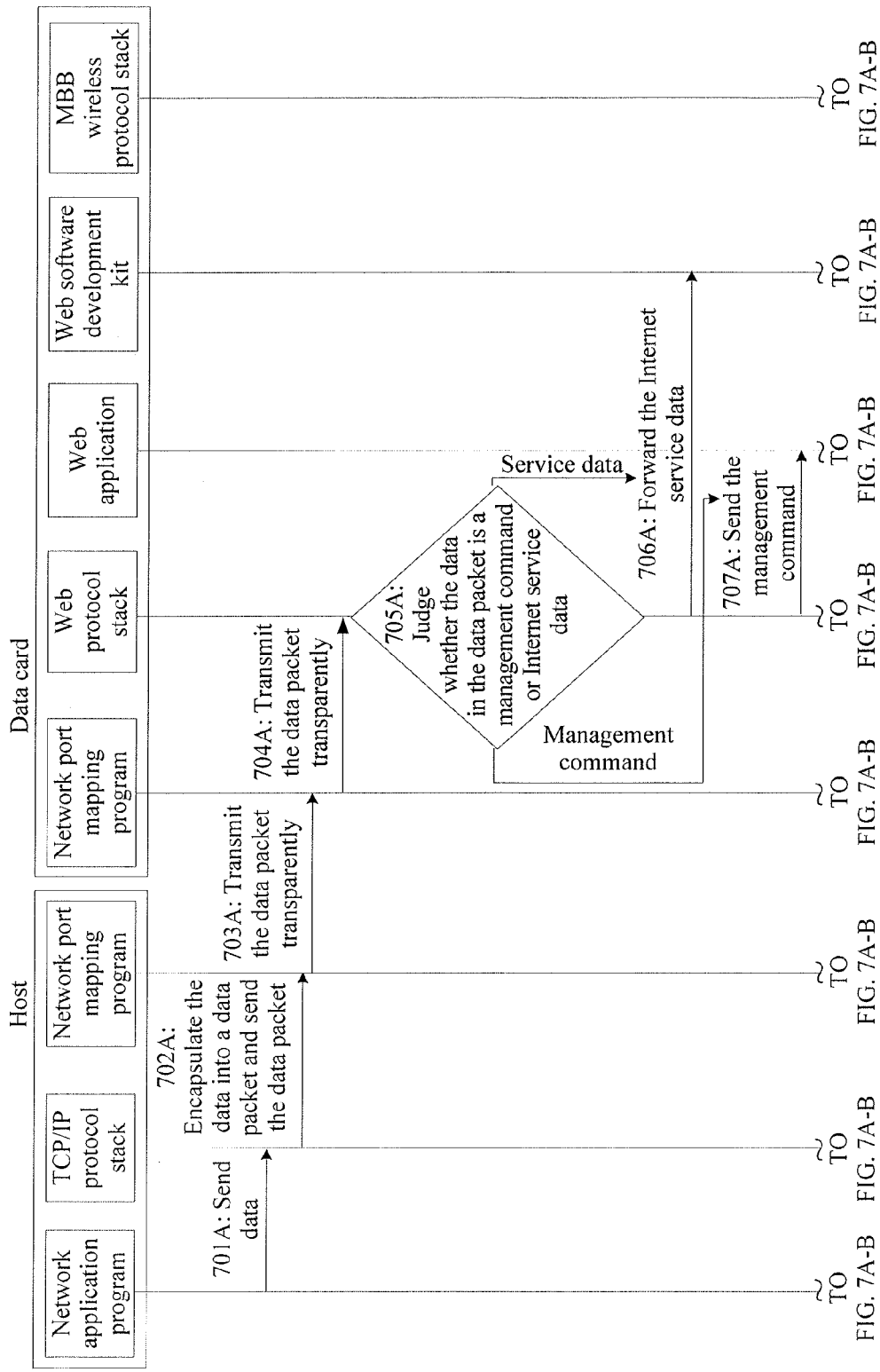
FIG. 7A-A

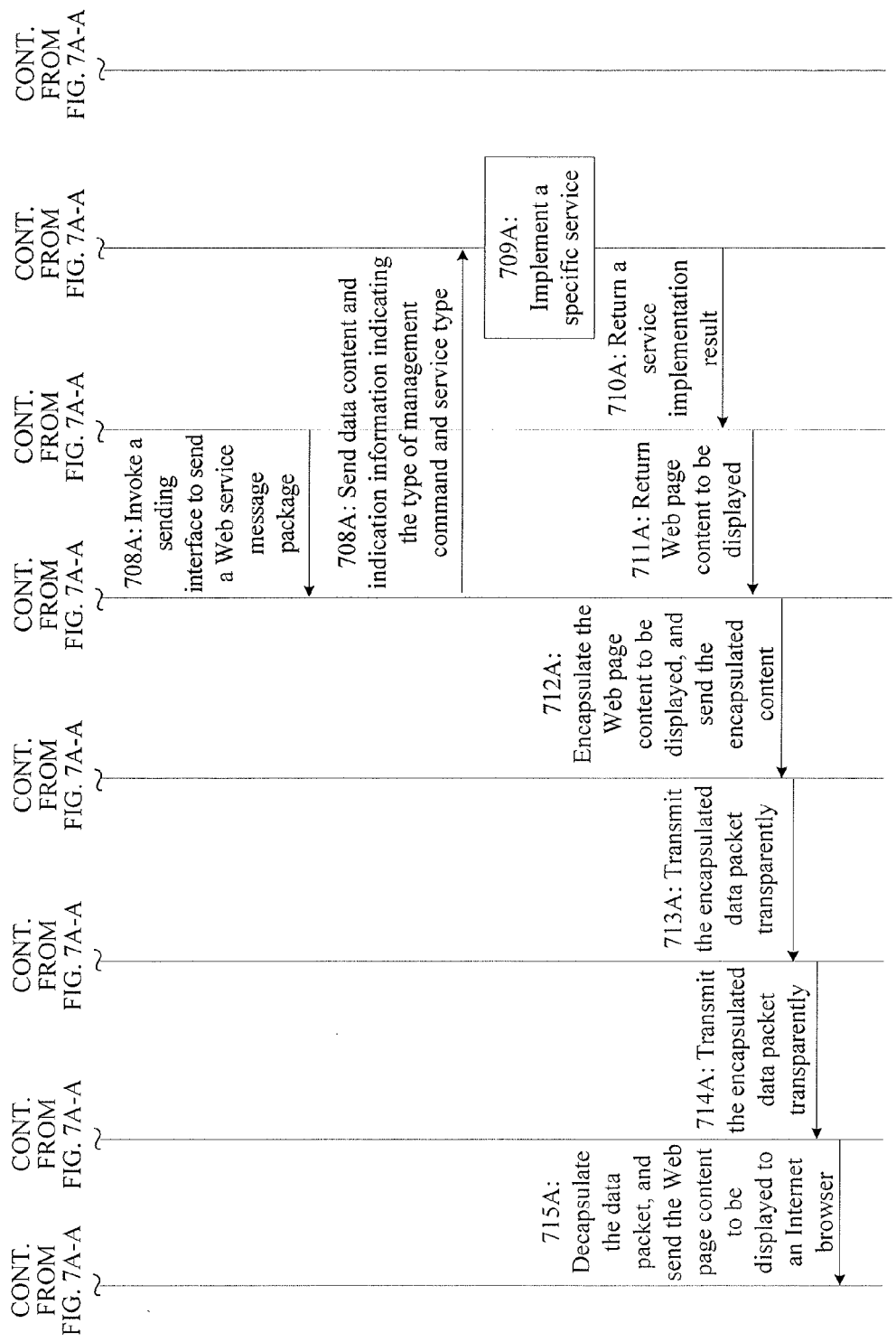
FIG. 7A-B

| | |
|---|---|
| After a user opens a Web framework page, the user clicks a button corresponding to a short message service, and an Internet browser obtains a management command that indicates to provide a short message sending page, encapsulates the management command into a data packet in an HTTP format, and sends the data packet to a TCP/IP protocol stack on a host; the TCP/IP protocol stack encapsulates the data packet in the HTTP format, and sends the encapsulated data packet to a data card | 801 |
| After receiving the data packet, a TCP/IP protocol stack of the data card decapsulates the data packet, and sends a data packet which is obtained through decapsulation and in the HTTP format to an HTTP server; after decapsulating the data packet, the HTTP server obtains a management command that indicates to provide a short message sending page, searches the Web application for an html file corresponding to the short message sending page, encapsulates the html file into a data packet in the HTTP format, and sends the data packet to the TCP/IP protocol stack of the data card; the TCP/IP protocol stack of the data card encapsulates the received data packet from the HTTP server, and sends the encapsulated data packet to the host | 802 |
| The TCP/IP protocol stack on the host decapsulates the data packet from the data card to obtain a data packet in the HTTP format, and sends the data packet to the Internet browser; the Internet browser decapsulates the data packet in the HTTP format to obtain an html file corresponding to the short message sending page, and displays the short message sending page according to the html file | 803 |
| The user enters a phone number of a recipient and text content of a short message on the short message sending page, and clicks the Send button; the Web application receives a short message sending command, where the short message sending command is a management command used to indicate to send a short message | 804 |
| The Web application on the Web framework generates data content according to the short message sending command, and invokes a sending interface that is suitable for sending an HTTP file to send the HTTP file to the HTTP server | 805 |

DATA CARD AND METHOD FOR INTERNET ACCESS OF DATA CARD

CROSS-REFERENCE TO RELATED APPLICATION

This application claims priority to Chinese Patent Application No. 201110036920.5, filed on Feb. 12, 2011, which is hereby incorporated by reference in its entirety.

FIELD OF THE INVENTION

The present invention relates to the field of wireless communication technologies, and in particular, to a data card and a method for Internet access of the data card.

BACKGROUND OF THE INVENTION

With the extensive application of mobile wireless communication technology the need for data cards that support various wireless access technologies has emerged. Examples of such data cards include a 3G data card and a 3G USB Modem. These data cards are also called mobile broadband devices.

In the conventional art, a data card may be used to access the Internet and run services through a process that mainly includes:

(1) Inserting the data card into a host, and mapping the data card into a storage device.

In the mapping step, a device descriptor that describes the data card as a storage device is reported to the host according to a USB protocol. After receiving the device descriptor, the host delivers a storage device initialization request to the data card. Once the data card performs initialization according to the initialization request it is mapped as a magnetic storage disk on the host.

(2) Installing a driver and PC client software.

To enable the data card to perform the specific functions, e.g. Internet access, that an OEM designed it for, a driver and PC client software need to be installed. The equipment vendor provides a dedicated driver and PC client software necessary to implement the functionality of the data card. The PC client software is a high-level application on the PC that provides an operating interface in order to enable services such as dial-up access, traffic statistics, short messaging, and phone books.

(3) Allowing the data card to switch into operating mode automatically, and be mapped into a functional device by the host. The term functional device refers to a device capable of completing some function, specifically the function for which the data card was designed by the OEM to perform. For example, such function could refer to an Internet access function.

(4) Allowing a user to enable Internet access by utilizing the dial-up services provided through the PC client software. The user may also perform other services as well as management tasks by running the PC client software in order to enable other functionality, for example, short message sending and receiving.

Currently, a majority of data cards have USB interfaces and fewer data cards use Express interfaces. As shown in FIG. 1, after the driver is run on the host, the modem may be mapped into a serial port. Thereafter, a PC client program is installed on the host and the PC client program provides the user with an operating interface, receives an operation instruction entered by the user, and performs information interaction with the data card through an AT command. The AT command implements services such as dial-up access, traffic statistics, short messaging, and phone books. The AT command is a standard modem interface protocol defined by the ITU-T.

One significant disadvantage of the conventional art is the substantial amount of time required to install the driver. Before the data card can be used for the first time, a user must install the driver software provided by the equipment vendor. This driver installation process may take from one to five minutes or significantly longer if an OS needs to be restarted.

SUMMARY OF THE INVENTION

Embodiments of the present invention provide a data card and a method for Internet access by the data card that allows fast Internet access to be implemented without installing a driver.

In view of this, the embodiments of the present invention provide:

A method for Internet access by a data card after the data card is connected to a host, including:

Mapping the data card into an Internet access device by using an Ethernet interface protocol;

Obtaining, by the data card, dial-up information and using the dial-up information to dial and therebyrequest to connect to a network; and Performing, by the Internet access device, communication between the host and the network.

The data card includes:

An initializing module configured to, after the data card is connected to a host, report to the host a device descriptor that complies with the requirements for specifying an Ethernet interface protocol, receive a subsequent initialization command sent by the host to the data card, and configure a parameter of a device function program according to such initialization command so that the device function program is mapped into an Ethernet interface;

A dialing module configured to obtain dial-up information and use the dial-up information to dial and request to connect to a network;

A communicating module configured to, after the device function program is configured, send Internet service data sent by the configured device program, send data sent by the host through the configured device function program to the network, and send data from the network to the configured device function program; and The configured device function program, which is configured to send data from the host to the communicating module and to send data from the communicating module to the host.

According to the embodiments of the present invention, the data card is mapped into the Internet access device by using the Ethernet interface protocol, so that the data card has an Internet access function; the data card with the Internet access function allocates an address to the host, and performs communication between the host and the network by using the address allocated to the host and an address that the network allocates to the data card. In this way, the host may be quickly connected to the network without installing a driver.

BRIEF DESCRIPTION OF THE DRAWINGS

In order to make the technical solutions according to the embodiments of the present invention clearer, accompanying drawings required for illustrating the embodiments are briefly described below. Evidently, the accompanying drawings in the following description are only some embodiments of the present invention, and persons of ordinary skill in the art may further obtain other drawings from these accompanying drawings without creative efforts.

FIG. 7A-A and FIG. 7A-B are another flowchart about processing a data stream from a host according to an embodiment of the present invention;

FIG. 7B is another schematic diagram about transmitting a data stream according to an embodiment of the present invention;

FIG. 8A and FIG. 8B are a flowchart about short message sending based on a Web framework according to an embodiment of the present invention;

DETAILED DESCRIPTION OF THE EMBODIMENTS

The technical solutions according to the embodiments of the present invention are described clearly and completely below with reference to the accompanying drawings according to the embodiments of the present invention. Apparently, the embodiments described below are merely part of rather than all of the embodiments of the present invention. Based on the embodiments of the present invention, all other embodiments obtained by persons of ordinary skill in the art without making creative efforts shall fall within the scope of the present invention.

Figure 1:
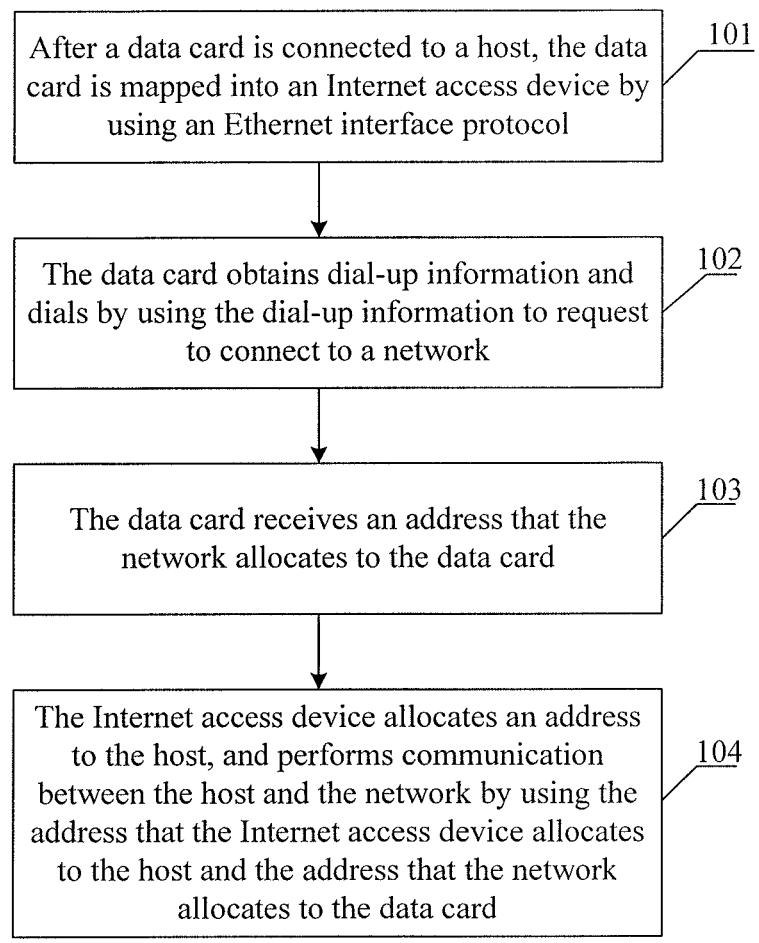
FIG. 1 is a flowchart of a method for Internet access of a data card according to an embodiment of the present invention.

Referring to FIG. 1, an embodiment of the present invention provides a method for Internet access of a data card, where the method mainly includes:

101: After a data card is connected to a host, the data card is mapped into an Internet access device by using an Ethernet interface protocol.

The Ethernet interface protocol is an Ethernet control model (Ethernet Control Model, ECM) protocol or a remote-network device interface specification (Remote-Network Device Interface Specification, RNDIS) protocol.

In step 101, the data card may be directly mapped into an Internet access device, or the data card may be mapped into a storage device first, and then the data card switches a mode and is mapped into an Internet access device. A process of mapping the data card into an Internet access device includes: The data card reports a device descriptor that is compliant with a requirement of a device specification of the Ethernet interface protocol to the host, where the device descriptor is used to trigger the host to run an Ethernet interface driver; the data card receives an initialization command that is sent by the Ethernet interface driver run on the host and compliant with the Ethernet interface protocol; the data card performs initialization according to the initialization command, so that the data card has an Internet access function.

If the data card is mapped into a storage device first, the host runs a software module stored in the storage device before the data card reports the device descriptor that is compliant with the requirement of the device specification of the Ethernet interface protocol to the host, and then send a mode switching command to the data card by using an application or a driver or modifying registry. The mode switching command triggers the data card to report the device descriptor that is compliant with the requirement of the device specification of the Ethernet interface protocol to the host, so as to trigger the host to run the Ethernet interface driver.

102: The data card obtains dial-up information and dials by using the dial-up information to request to connect to a network.

In step 102, the obtaining, by the data card, the dial-up information includes: When pre-stored dial-up information exists, obtaining the pre-stored dial-up information, where the pre-stored dial-up information is one piece of the following dial-up information: previous dial-up information of a user, dial-up information of an operator, and dial-up information stored in a subscriber identity module card inserted in the data card; when no pre-stored dial-up information exists, obtaining dial-up information that the user enters on a Web page. When the pre-stored dial-up information exists, automatic dial-up is performed by using the pre-stored dial-up information, which does not require user manual input, and thus a network access speed may be increased and user experience may be improved. There may be different forms of dial-up information for different networks. For example, for a wideband code division multiple access (Wideband Code Division Multiple Access, WCDMA) network, dial-up information includes a dialing number and an access point name (Access Point Name, APN) identifier string; for a wideband code division multiple access (Wideband Code Division Multiple Access, CDMA) network, dial-up information includes a dialing number, a user name, and a password.

The data card may perform dialing by using a Web framework to request to connect to the network. The Web framework is used to provide an operating interface so as to implement services such as dial-up access, short message, and phone book. For a specific manner for dialing by using the Web framework, reference is made to the detail description in subsequent embodiments. Optionally, the data card may perform dialing by using PC client software rather than the Web framework.

103: The data card receives an address that the network allocates to the data card.

104: The Internet access device allocates an address to the host, and performs communication between the host and the network by using the address that the Internet access device allocates to the host and an address that the network allocates to the data card.

Step 102 and step 103 are executed in sequence, while step 101 and step 102 to step 103 do not have an order in terms of execution, and may be executed in parallel.

According to the embodiment of the present invention, the data card is mapped into the Internet access device by using the Ethernet interface protocol, so that the data card has the Internet access function; the data card with the Internet access function allocates the address to the host, and performs communication between the host and the network by using the address allocated to the host and the address that the network allocates to the data card. In this way, the host may be quickly connected to the network without installing a driver. In addition, if dial-up access is performed directly by using the pre-stored dial-up information, a dial-up speed may be further increased.

To help understand the technical solution provided by the foregoing embodiment of the present invention more clearly, the following embodiment describes a method for Internet access of a data card in detail.

Figure 2:
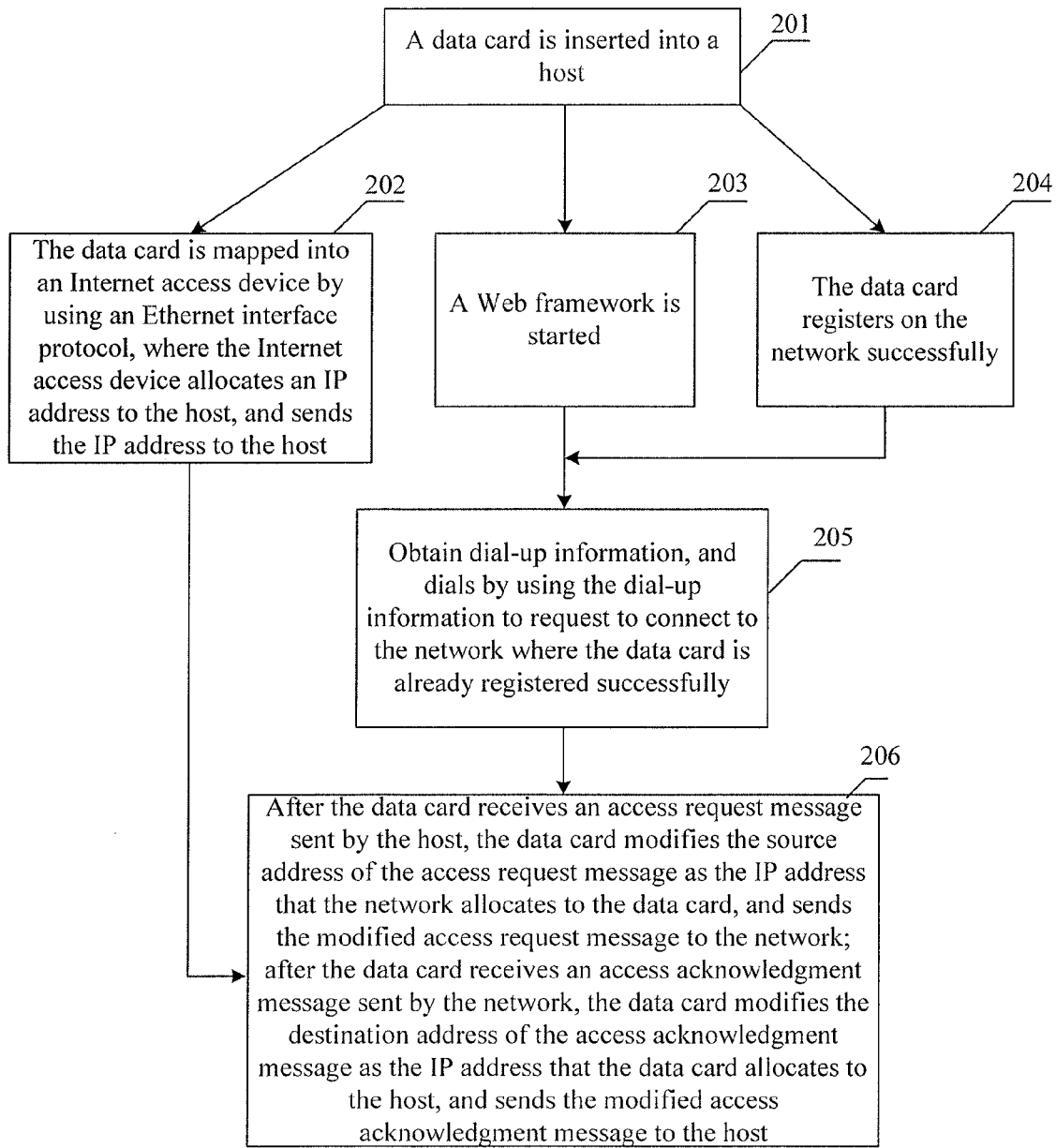
FIG. 2 is a flowchart of another method for Internet access of a data card according to an embodiment of the present invention.

Referring to FIG. 2, an embodiment of the present invention provides a method for Internet access of a data card, where the method includes:

201: A data card is connected to a host.

Any operating system may be run on the host, for example, operating systems such as Windows, Mac, and Linux.

202: The data card is mapped into an Internet access device by using an Ethernet interface protocol. The Internet access device allocates an IP address to the host, and sends the IP address to the host.

Figure 3:
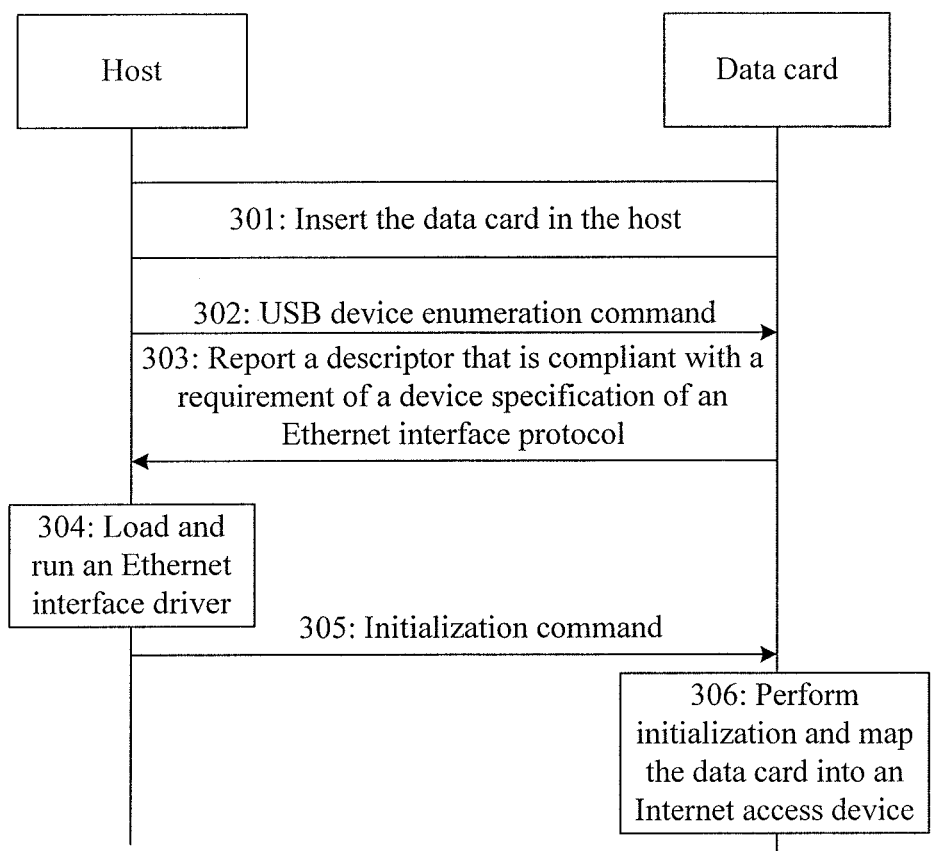
FIG. 3 is a flowchart about mapping into an Internet access device according to an embodiment of the present invention.

For a process of mapping the data card into an Internet access device, reference is made to the detail description in a subsequent embodiment as shown in FIG. 3.

203: After the data card is inserted into the host, a Web framework is started.

After the data card is powered on, the Web framework is started automatically. The Web framework includes a Web application, a Web protocol stack, and a Web software development kit. The Web protocol stack includes a Web server and a TCP/IP protocol stack. Reference is made to the detail description in subsequent embodiments for details.

204: The data card searches for a network by using a mobile broadband protocol, sends a register request message to the searched network, and receives a register success response message sent by the network.

Step 202, step 203, and step 204 do not have an order in terms of execution, and may be executed in parallel.

205: The Web framework in the data card obtains dial-up information, and dials by using the dial-up information to request to connect to the network where the data card is already registered successfully in step 204. The network allocates an IP address to the data card, and sends the IP address to the data card.

Figure 4:
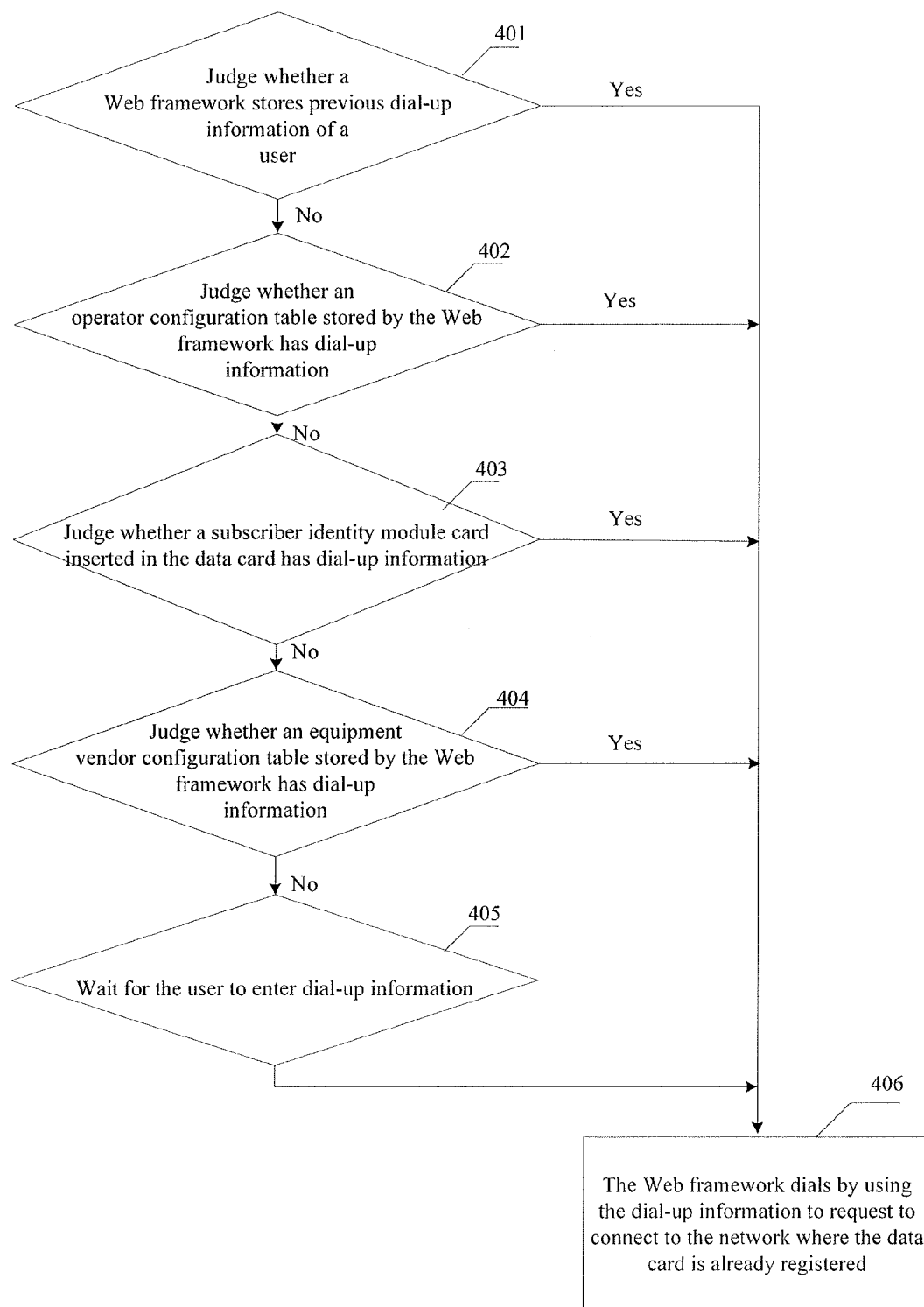
FIG. 4 is a flowchart of dial-up access according to an embodiment of the present invention.

For a process of dial-up access by the data card, reference is made to the detail description in a subsequent embodiment as shown in FIG. 4.

206: The host sends an access request message to the data card, where the source address of the access request message is the IP address that the data card allocates to the host. After the data card receives the access request message, the data card modifies the source address of the access request message as the IP address that the network allocates to the data card, and sends the modified access request message to the network. The network sends an access acknowledgement message to the host, where the destination address of the access acknowledgement message is the IP address that the network allocates to the data card. After the data card receives the access acknowledgement message sent by the network, the data card modifies the destination address of the access acknowledgement message as the IP address that the data card allocates to the host, and sends the modified access acknowledgement message to the host.

A specific implementation process of step 201 to step 202 includes:

301: The data card is inserted into the host, and a USB host driver of the host detects that the data card is inserted.

Any operating system may be run on the host, for example, operating systems such as Windows, Mac, and Linux.

302: The USB host driver of the host sends a USB command to the data card.

In this embodiment, the USB command may be a USB device enumeration command.

303: After receiving the USB command, the data card reports a device descriptor that is compliant with a requirement of a device specification of the Ethernet interface protocol to the host, where the device descriptor is used to trigger the host to run an Ethernet interface driver.

The device descriptor describes features of the data card, and describes the data card as an Internet access device.

The Ethernet interface protocol may be an ECM protocol or RNDIS protocol. In this step, the data card determines, according to the USB command, whether a current operating system run on the host is the Windows operation system; if the current operation system run on the host is the Windows operation system, the data card reports a device descriptor that is compliant with a requirement of a device specification of the RNDIS protocol to the host; if the current operation system run on the host is not the Windows operation system, the data card reports a device descriptor that is compliant with a requirement of a device specification of the ECM protocol to the host.

Specifically, it may be an initializing module in the data card that reports a device descriptor that is compliant with the requirement of the device specification of the Ethernet interface protocol to the host after receiving the USB command.

304: After receiving the device descriptor, the host loads the Ethernet interface driver to the memory of the host to run the Ethernet interface driver.

The Ethernet interface driver may be an ECM driver or an RNDIS driver. The Ethernet interface driver is a driver included in the operating system. If the Windows operating system is run on the host, the Ethernet interface driver is an RNDIS driver, and the host loads the RNDIS driver to the memory and runs the RNDIS driver. If an operating system other than the Windows operating system is run on the host currently, the Ethernet interface driver is an ECM driver, and the host loads the ECM driver to the memory and runs the ECM driver.

305: After running the Ethernet interface driver, the host invokes the USB host driver in the operating system according to the specification of the Ethernet interface protocol to send an initialization command that is compliant with the Ethernet interface protocol to the data card.

306: The data card performs a corresponding initialization operation according to the received initialization command, and feeds back a response message that is compliant with the Ethernet interface protocol to the host, where the response message indicates whether the data card is initialized successfully. If the initialization succeeds, the data card is mapped into an Internet access device.

Specifically, it may be the initializing module in the data card that initializes a device function program in the data card after receiving the initialization command, so that the device function program is mapped into an Ethernet interface and that the data card has the Internet access function. Then, the initializing module feeds back a response message that is compliant with the Ethernet interface protocol to the host. The initializing the device function program in the data card is configuring a parameter in the device function program.

Subsequently, if the response message received by the host indicates that the data card is initialized successfully, the host sends an address allocation request message to the data card; after receiving the address allocation request message, the data card allocates an IP address to the host, and sends the IP address to the host.

Specifically, after receiving an address allocation request, the device function program in the data card sends the address allocation request to the TCP/IP protocol stack in the data card; the TCP/IP protocol stack in the data card allocates an IP address to the host, and sends the IP address to the host.

A specific implementation process of step 205 includes:

401: The Web framework judges whether the Web framework stores previous dial-up information of a user; if the Web framework stores the previous dial-up information of the user, the previous dial-up information of the user is obtained, and the process goes to 406; if the Web framework does not store the previous dial-up information of the user, the process goes to 402.

Generally, after the user is connected to the network through dial-up, the user usually uses dial-up information the same as the previous dial-up information to access the network again later. Therefore, in this step, whether the previous dial-up information of the user exists is judged.

402: The Web framework judges whether dial-up information exists in an operator configuration table stored in the Web framework; if the dial-up information exists in the operator configuration table stored in the Web framework, the dial-up information is obtained, and the process goes to 406; if the dial-up information does not exist in the operator configuration table stored in the Web framework, the process goes to 403.

An operator may require an equipment vendor to add an operator configuration table to the Web framework. In this way, when the data card is delivered, the Web framework of the data card stores the operator configuration table that stores information configured by the operator. This step is to judge whether the operator configuration table has the dial-up information configured by the operator.

403: The Web framework judges whether a subscriber identity module card inserted in the data card has dial-up information; if the subscriber identity module card inserted in the data card has the dial-up information, the dial-up information in the subscriber identity module card is obtained, and the process goes to 406; if the subscriber identity module card inserted in the data card does not have the dial-up information, the process goes to 404.

The operator may pre-stored dial-up information in the subscriber identity module card, where the subscriber identity module card may be a SIM card, a USIM card or a UIM card. The SIM card is a subscriber identity module card applicable on a 2G network, the USIM card is a subscriber identity module card applicable on a wideband code division multiple access (Wideband Code Division Multiple Access, WCDMA) network, while the UIM card is a subscriber identity module card applicable on a wideband code division multiple access (Wideband Code Division Multiple Access, CDMA) network.

404: The Web framework judges whether dial-up information exists in an equipment vendor configuration table stored in the Web framework; if the dial-up information exists in the equipment vendor configuration table stored in the Web framework, the dial-up information is obtained, and the process goes to 406; if the dial-up information does not exist in the equipment vendor configuration table stored in the Web framework, the process goes to 405.

The Web framework stores an equipment vendor configuration table that stores information configured by the equipment vendor. Because most of dial-up information used by global operators is public, the equipment vendor may write the dial-up information to the equipment vendor configuration table. In this way, when the data card is delivered, the equipment vendor configuration table already stores the dial-up information.

It should be noted that the foregoing steps 401 to 404 are executed by a first dialing module of dialing modules in the Web framework after the Web framework is started.

405: Wait for the user to enter the dial-up information. The Web framework obtains the dial-up information that the user enters on the Web page on the host.

After the Web framework is started, the user may enter an address of the data card in an Internet browser to open a Web framework page. If the user clicks the Dial-up button, a dial-up page may appear in the Internet browser. The user enters the dial-up information on the dial-up page.

The address of the data card refers to the IP address of the Web framework of the data card or the Web address of the Web framework of the data card.

406: The Web framework dials by using the dial-up information to request to connect to the network where the data card is already registered.

It should be noted that the four judgments in the foregoing steps 401 to 404 do not have a certain execution order. Optionally, the judgment in step 402 may be executed first; when the judgment result is false in step 402, the judgment in step 401 is executed; when the judgment result is false in step 401, the judgments in step 403 and step 404 are executed. Alternatively, the judgment in step 403 is executed first; when the judgment result is false in step 403, the judgments in step 401 and step 402 are executed in sequence; when the judgment result is false in step 402, the judgment in step 404 is executed.

After the data card is inserted in the host and connected to the network, the data card processes data from the host. The data from the host is divided into two types. One type is Internet application data. An Internet application data stream may come from a Web page browsed by the Internet browser of the host or come from Internet application software, for example, instant messaging software such as QQ and MSN. The other type is a management command. The management command is a command used to operate a data card service, for example, a command for sending a short message.

Figure 5A:
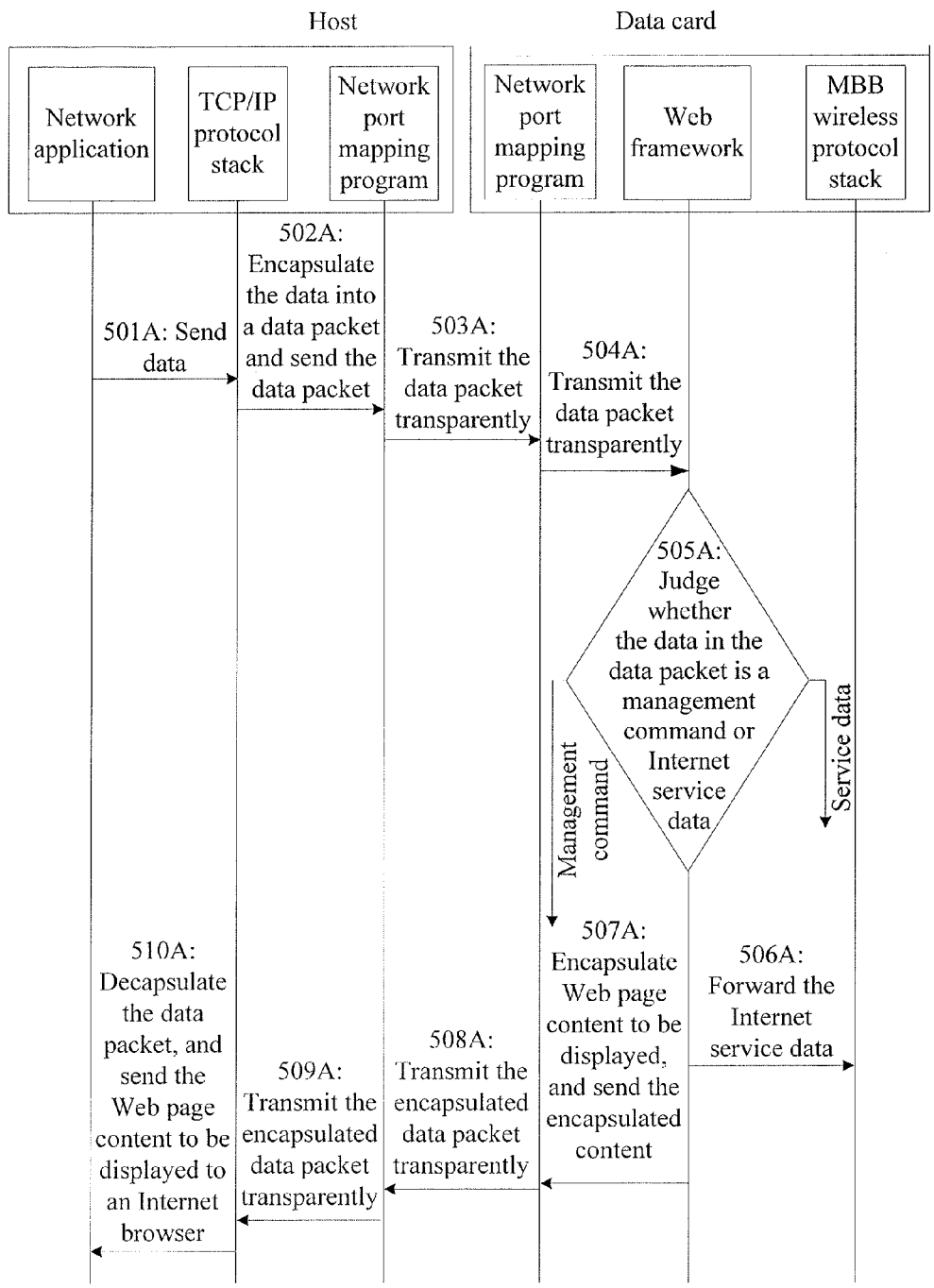
FIG. 5A is a flowchart about processing a data stream from a host according to an embodiment of the present invention.

As shown in FIG. 5A, a process of processing a data stream from a host is described below:

501A: A network application on a host delivers data to a TCP/IP protocol stack in a Web framework.

The network application on the host includes an Internet application and Internet browser, where the Internet application may be instant messaging software such as QQ and MSN.

502A: The TCP/IP protocol stack on the host encapsulates the data, and sends an encapsulated data packet to a network port mapping program.

503A: The network port mapping program on the host sends the data packet to the data card through a USB port.

The network port mapping program is a network port mapping program at a host side, and the network port mapping program at the host side includes an Ethernet interface driver at the host side and a USB driver at the host side. Specifically, after receiving the data packet sent by the TCP/IP protocol stack, the Ethernet interface driver at the host side invokes the USB driver at the host side in an operating system to send the data packet to the data card through the USB port.

504A: The network port mapping program in the data card sends the data packet to the Web framework in the data card.

The network port mapping program in the data card is the network port driver at a device side. The network port driver at the device side includes a device function program and a USB driver at the device side. Specifically, the USB driver at the device side receives the data packet, and sends the data packet to the device function program; the device function program sends the data packet to the Web framework.

505A: The Web framework in the data card decapsulates the data packet, and determines, according to the destination address of the data packet, whether the data in the data packet is a management command or Internet service data; if the data in the data packet is the Internet service data, the process goes to 506A; if the data in the data packet is the management command, the process goes to 507A.

Specifically, if the destination address of the data packet is the address of the data card, it is determines that the data in the data packet is the management command. Specifically, the address of the data card may be the IP address of the data card or the domain name of the data card.

506A: The Web framework in the data card sends the Internet service data to an MBB wireless protocol stack. The MBB wireless protocol stack encapsulates the Internet service data, and sends the encapsulated data to the network. The process ends.

507A: According to the management command, the Web framework in the data card encapsulates Web page content to be displayed, and sends the encapsulated data packet to the network port mapping program in the data card.

If the management command indicates that a page is provided for the user to an implement specific service by using the page, for example, a dial-up access page is provided for the user to enter specific dial-up information on the page or a short message sending page is provided, the Web page content to be displayed is an html file stored in the Web framework, for example, a dialup.html file. If the management command indicates that a specific service needs to be implemented, the Web framework needs to implement a specific service according to the management command, and refresh the Web page content according to the service implementation result. The refreshed Web page content is the Web page content to be displayed. For example, the management command indicates that specific content of a short message text is sent to a phone number of a recipient, the Web framework may invoke a short message service interface provided by board software (the short message service interface provided by the board software is a low-layer interface function of the MBB) to send the specific content of the short message text to the phone number of the recipient. The Web framework refreshes the Web page content according to the sending result (namely, success or failure), and encapsulates the refreshed Web page content for sending. In this way, after the host receives the encapsulated content subsequently, a short message sending result may be displayed to notify the user of whether the short message is sent successfully.

508A: The network port mapping program in the data card transparently transmits the encapsulated data packet to the network port mapping program on the host.

509A: The network port mapping program on the host sends the encapsulated data packet to the TCP/IP protocol stack on the host.

510A: The TCP/IP protocol stack on the host decapsulates the encapsulated data packet to obtain the Web page content to be displayed, and sends the Web page content to be displayed to the Internet browser on the host. Subsequently, the Internet browser on the host displays the Web page according to the Web page content to be displayed, for example, displays a dial-up page or a short message sending page.

Figure 5B:
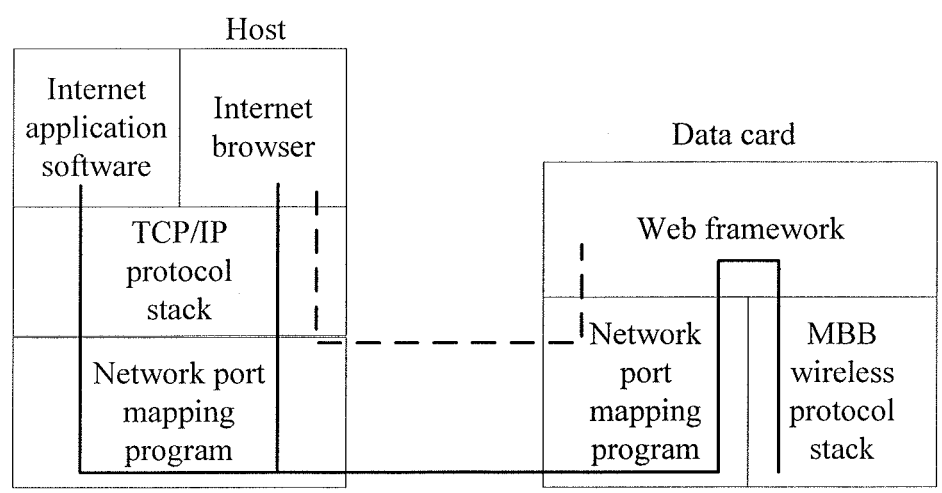
FIG. 5B is a schematic diagram about transmitting a data stream according to an embodiment of the present invention.

Specifically, the transmission of the management command and Internet service data is shown in FIG. 5B. In FIG. 5B, the dotted line indicates the management command, and the solid line indicates the Internet service data.

Embodiments shown in FIG. 6A, FIG. 7A-A, and FIG. 7A-B describe how the Web framework processes a data stream in detail below.

Figure 6A:
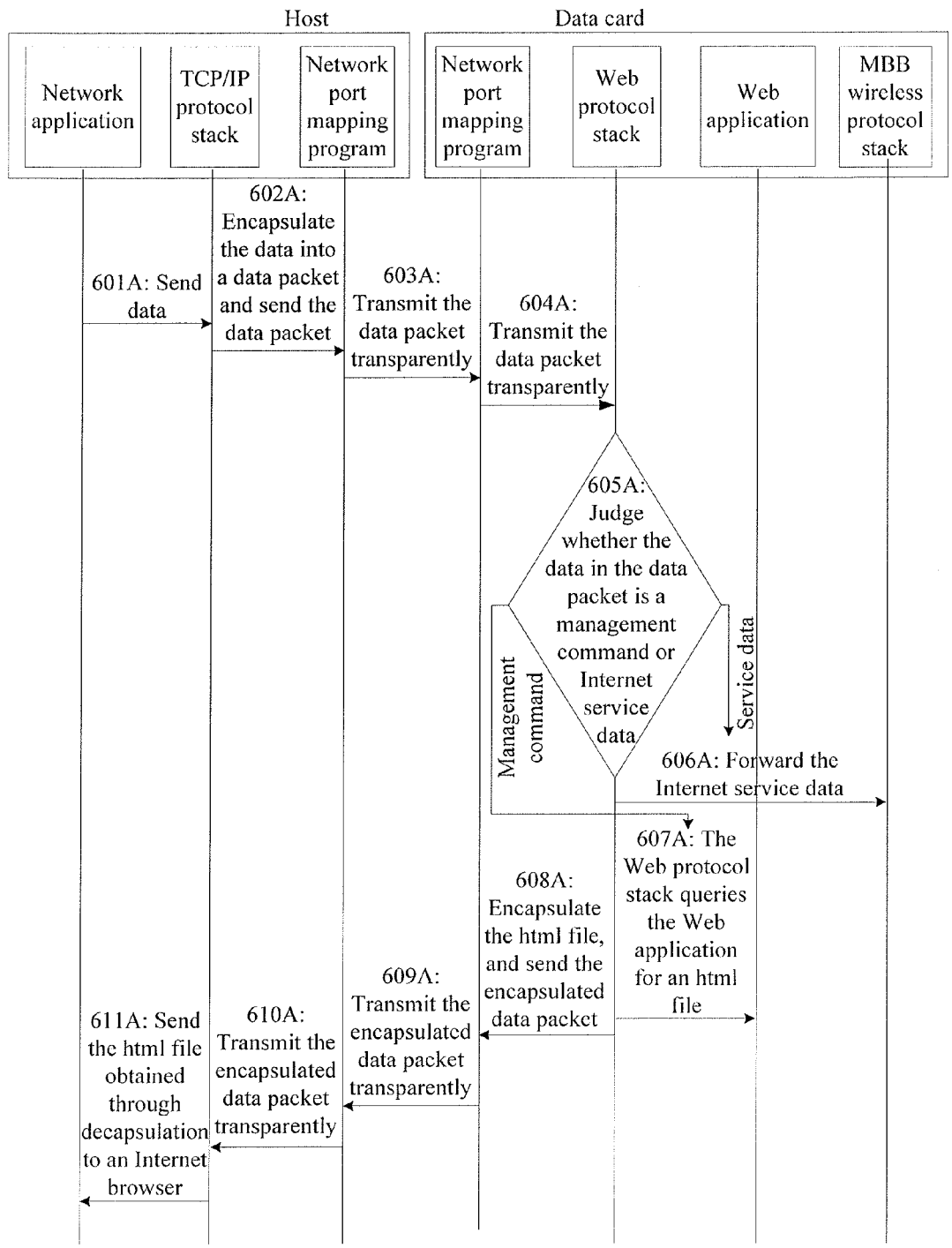
FIG. 6A is another flowchart about processing a data stream from a host according to an embodiment of the present invention.

Referring to FIG. 6A, a specific method for processing a data stream from the host is described below. In this method, it is assumed that data from the host is a management command and that the management command indicates that a page is provided for a user to implement a specific service by using the page. For example, the management command indicates that a dial-up access page is provided for the user to enter specific dial-up information on the page, or that a short message sending page is provided for the user to enter a specific phone number of a short message recipient and text content of a short message on the page. The method specifically includes:

Steps 601A to 603A are the same as steps 501A to 503A, and are not repeatedly described here.

604A: The network port mapping program in the data card sends the data packet to a Web protocol stack in the data card.

605A: The Web protocol stack decapsulates the data packet, and determines, according to the destination address of the data packet, whether the data in the data packet is a management command or Internet service data; if the data in the data packet is the Internet service data, the process goes to 606A; if the data in the data packet is the management command, the process goes to 607A.

Specifically, if the destination address of the data packet is the address of the data card, the Web protocol stack determines that the data in the data packet is the management command. Specifically, the address of the data card may be the IP address of the data card or the domain name of the data card.

606A: The Web protocol stack sends the Internet service data to an MBB wireless protocol stack. The MBB wireless protocol stack encapsulates the Internet service data, and sends the encapsulated data. The process ends.

607A: If the management command indicates that a page is provided for the user to implement a specific service by using the page, the Web protocol stack queries the Web application for Web page content corresponding to the page, for example, a file in a hypertext mark-up language (Hypertext Mark-up Language, html) format, which is briefly called an html file.

The Web page content may be an html file, and may also be a jsp (Java Server Pages) file, or an active server page (Active Server Page, asp) file, or a hypertext preprocessor (Hypertext Preprocessor, php) file. This embodiment of the present invention is described based on an html file. In other embodiments, a file in another format may also be used, which does not affect the implementation of the present invention.

608A: The Web protocol stack encapsulates the html file, and sends the encapsulated data packet to the network port mapping program in the data card.

609A: The network port mapping program in the data card transparently transmits the encapsulated data packet to the network port mapping program on the host.

610A: The network port mapping program on the host sends the encapsulated data packet to the TCP/IP protocol stack on the host.

611A: The TCP/IP protocol stack on the host decapsulates the encapsulated data packet, and sends the decapsulated data packet to the Internet browser on the host. Subsequently, the Internet browser on the host displays the page according to the html file, for example, displays a dial-up page or a short message sending page.

Figure 6B:
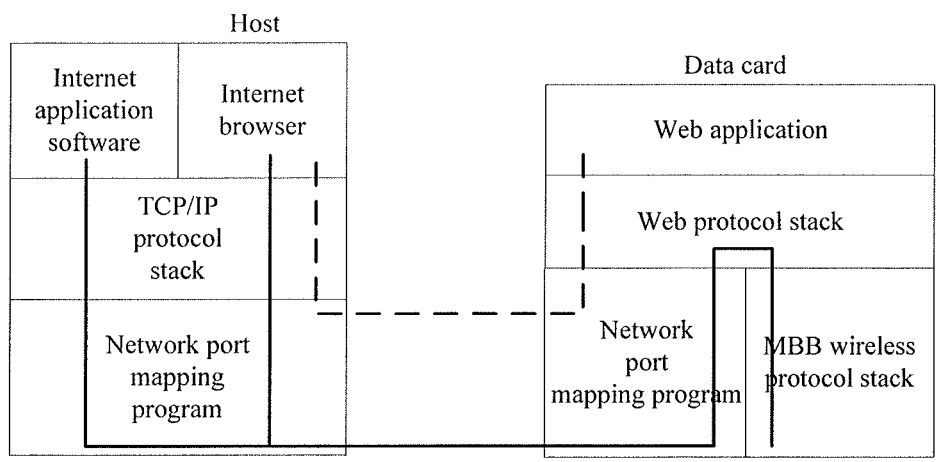
FIG. 6B is another schematic diagram about transmitting a data stream according to an embodiment of the present invention.

Specifically, the transmission of the management command and Internet service data is as shown in FIG. 6B. In FIG. 6B, the dotted line indicates the management command, and the solid line indicates the Internet service data.

Figure 7B:
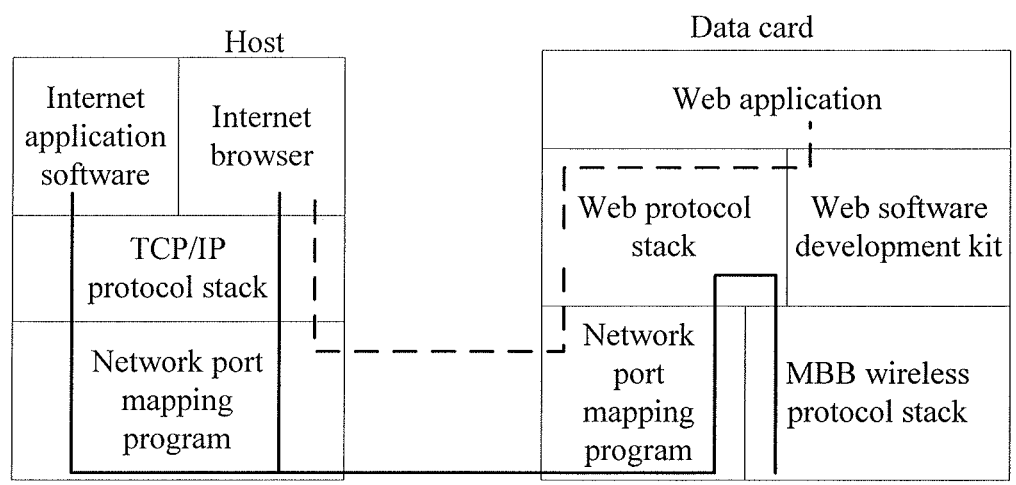
Figure 8B:
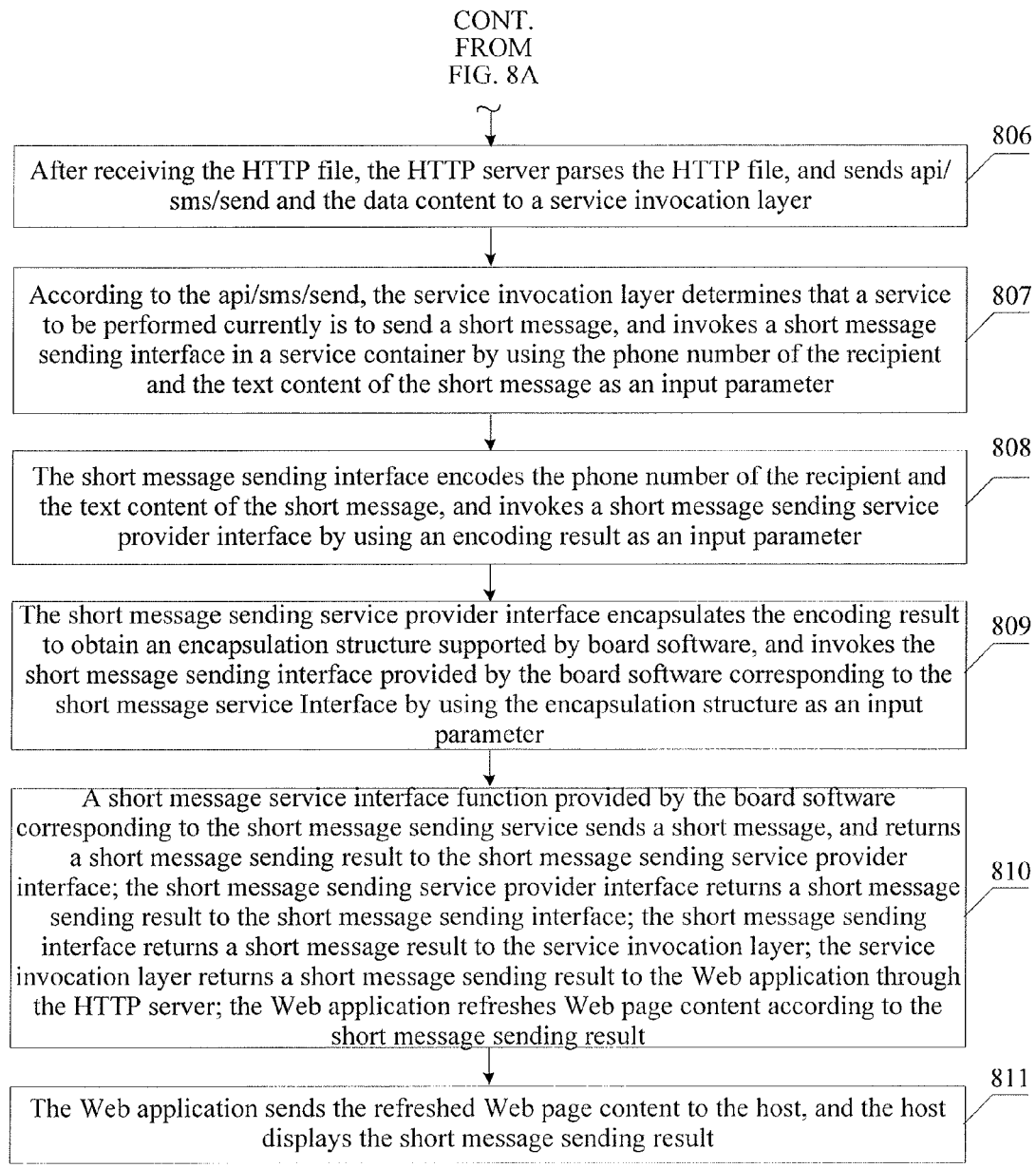

As shown in FIG. 7A-A and FIG. 7A-B, another process of processing a data stream from a host is described below, where the process specifically includes:

Steps 701A to 707A are the same as steps 601A to 607A, and are not repeatedly described here.

707A: If the management command indicates that the specific service needs to be implemented, the Web protocol stack sends the management command to the Web application.

For example, if the management command indicates that the specific text content of a short message is sent to the phone number of a recipient, the Web protocol stack sends the management command to the Web application.

708A: According to the management command, the Web application invokes a sending interface that is suitable for sending a Web service message package, and sends a Web service message package to the Web protocol stack. The Web protocol stack parses the Web service message package, and sends data content and indication information indicating that the specific service needs to be implemented that are in the Web service message package to the Web software development kit. The sending interface is an application programming interface (Application Programming Interface, API), where the sending interface is based on an extensible markup language (Extensible Markup Language, XML) and an HTTP interface, or based on JSON (JavaScript Object Notation) and an HTTP interface, where the JSON is an interface in a data interchange format.

In the embodiment, the data content includes the text content of the short message and the phone number of the recipient.

709A: The Web software development kit implements the specific service.

In this embodiment of the present invention, the Web software development kit includes a service invocation layer (namely, Service Invocation Layer, referred to as SIL), a service container, and a service provider interface (Service Provider Interface, referred to as SPI). The service container includes each specific service implementing module, and each service implementing module has one or multiple service implementation interfaces, for example, a dialing module includes a dial-up interface, and a short message module may include a short message sending interface and a short message receiving interface, so that the service invocation layer can invoke these interfaces. The service provider interface is invoked by the service invocation layer and/or the service implementation interface. The service provider interface encapsulates an input parameter according to a command format supported by the board software in the data card, and then invokes a communication adaptation layer interface provided by the board software. It should be noted that the service implementation interface and the service provider interface that are in the Web software development kit belong to API interfaces.

The indication information indicating that the specific service needs to be implemented in step 708A indicates a type of management command and a specific service operation. The type of management command refers to Send/Modify or Get, where the Send/Modify is represented by the POST parameter and the Get is represented by the GET parameter. The specific service operation may be divided into a simple service operation and a complex service operation. The simple service operation refers to executing a simple AT command or QMI command. The AT command or QMI command is generally entered by an administrator in the Internet browser. After the service invocation layer identifies that the specific service operation indicated by the indication information is a simple service operation, the service invocation layer invokes the service provider interface directly. The complex service operation generally refers to an operation such as sending a short message by the user. After the service invocation layer identifies that the specific service operation indicated by the indication information is a complex service operation, the service invocation layer needs to invoke a specific service implementation interface. In this step, the service invocation layer, the service container, and the service provider interface are used to implement the specific service. For a specific implementation process, reference is made to the detail description in subsequent embodiments.

710A: The Web software development kit returns a service implementation result to the Web application.

711A: The Web application refreshes the Web page content according to the service implementation result, and sends the refreshed Web page content to the Web protocol stack, where the refreshed Web page content is the Web page content to be displayed.

The subsequent steps 712A to 715A are the same as steps 507A to 510A, and are not repeatedly described here.

Specifically, the transmission of the management command and Internet service data is shown in FIG. 7B. In FIG. 7B, the dotted line indicates the management command, and the solid line indicates the Internet service data.

The following specifically describes a process of processing a data stream by taking an example of sending a short message.

801: After a user opens a Web framework page by using an Internet browser, the user clicks a button corresponding to a short message service, and the Internet browser obtains a management command that indicates to provide a short message sending page, where the management command indicates that the short message sending page needs to be provided for the user to enter information and implement a short message sending service. The Internet browser encapsulates the management command into a data packet in an HTTP format, and sends the data packet to a TCP/IP protocol stack on a host. The TCP/IP protocol stack on the host encapsulates the data packet in the HTTP format, and sends the encapsulated data packet to a data card.

802: After the TCP/IP protocol stack of the data card receives the data packet, it decapsulates the data packet. The TCP/IP protocol stack determines, according to the destination address of the data packet, that the data in the data packet is a management command, and sends the data packet which is obtained through the decapsulation and in the HTTP format to an HTTP server. After decapsulating the data packet, the HTTP server obtains a management command that indicates to provide a short message sending page. The HTTP server searches, according to the management command, the Web application for an html file corresponding to the short message sending page, encapsulates the html file into a data packet in the HTTP format, and sends the data packet to the TCP/IP protocol stack of the data card. The TCP/IP protocol stack of the data card encapsulates the received data packet from the HTTP server, and sends the encapsulated data packet to the host.

Figure 9:
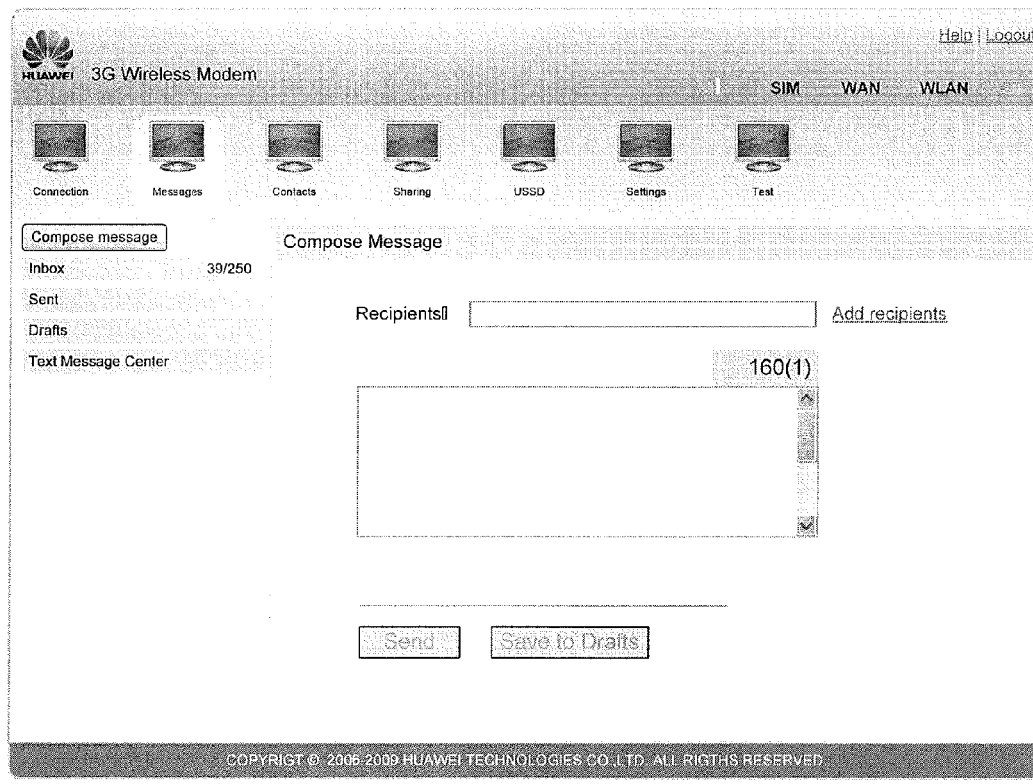
FIG. 9 is a diagram of a short message sending page according to an embodiment of the present invention.

803: The TCP/IP protocol stack on the host decapsulates the data packet from the data card to obtain a data packet in the HTTP format, and sends the data packet to the Internet browser. The Internet browser decapsulates the data packet in the HTTP format to obtain an html file corresponding to the short message sending page, and displays the short message sending page according to the html file, as shown in FIG. 9.

804: The user enters a phone number of a recipient and text content of a short message on the short message sending page, and clicks the Send button. The Web application receives a short message sending command, where the short message sending command is a management command used to indicate to send a short message.

Specifically, a process of receiving a short message sending command by the Web application includes: After the user clicks the Send button, the Internet browser obtains a short message sending command, encapsulates the short message sending command into a data packet in the HTTP format, and sends the data packet to the TCP/IP protocol stack on the host; the TCP/IP protocol stack on the host encapsulates the data packet in the HTTP format, and sends the encapsulated data packet to the data card; after receiving the data packet, the TCP/IP protocol stack of the data card decapsulates the data packet, determines, according to the destination address of the data packet, that the data in the data packet is a management command, and sends the data packet which is obtained through the decapsulation and in the HTTP format to the HTTP server. After decapsulating the data packet, the HTTP server obtains a short message sending command, and sends the short message sending command to the Web application.

805: The Web application on the Web framework generates data content according to the short message sending command, invokes a sending interface that is suitable for sending an HTTP file, and sends the HTTP file to the HTTP server.

The data content in this step is in the HTTP format.

It is assumed that the phone number of the recipient is "12512345678" and that the text content of the short message is "This is a demo sms text."

The HTTP file is specifically as follows:

```
POST /api/sms/send HTTP/1.1
<?xml version="1.0" encoding="UTF-8"?>
<api version="1.0">
   <request>
      <number>13512345678</number >
      <body>This is a demo sms text.</body>
   </request>
</api>
```

The HTTP file includes a data header and data content. The data header is POST/api/sms/send HTTP/1.1 and includes four parameters, namely, POST, sms, send, and HTTP/1.1. Specifically, the POST indicates that the type of the management command is Send or Modify; the HTTP/1.1 indicates that the HTTP version is version 1.1; the sms/send indicates that a short message sending interface in a short message module needs to be invoked subsequently to send a short message.

The data content of the HTTP file includes two fields. Definitions of the two fields are as shown in Table 1.

TABLE 1

| Field Name | Type | Length | Description |
| --- | --- | --- | --- |
| number | string | 31 | Phone number of the recipient |
| Body | string | 1000 | Text content of the short message |

806: After receiving the HTTP file, the HTTP server parses the HTTP file, and sends the api/sms/send and the data content to the service invocation layer, namely, Service Invocation Layer, referred to as SIL.

807: According to the api/sms/send, the service invocation layer determines that a service to be performed currently is to send a short message, and invokes the short message sending interface in a service container (Service Container) by using the phone number of the recipient and text content of the short message as an input parameter.

The service container stores each service implementation interface, for example, a dial-up interface used for dial-up access and a short message sending interface used to send a short message.

A form of the short message sending interface may be:
int SendSms(String strPhoneNumber, String strBody)

The service invocation layer parses the data content to obtain the phone number of the recipient and text content of the short message, and invokes the short message sending interface by using the phone number of the recipient and text content of the short message as the input parameter of the short message sending interface, namely:
SendSms("13512345678", "This is a demo sms text.")

808: The short message sending interface encodes the phone number of the recipient and the text content of the short message, and invokes a short message sending service provider interface by using an encoding result as an input parameter.

A form of the short message sending service provider interface may be:
int SPI_SendSms(String strPhoneNumber, String strBody)

In this case, invoke the following:
SPI_SendSms("13512345678", "This is a demo sms text.")

809: The short message sending service provider interface encapsulates the encoding result to obtain an encapsulation structure supported by board software, and invokes a short message service interface provided by the board software corresponding to the short message sending service by using the encapsulation structure as the input parameter.

The short message service interface provided by the board software is a low-layer interface function of the data card.

The command format supported by the board software may be an AT command, and may also be a QIM command.

The 3GPP TS 27.005 protocol defines a standard AT command.

810: The short message service interface provided by the board software corresponding to the short message sending service sends a short message, and returns a short message sending result to the short message sending service provider interface; the short message sending service provider interface returns a short message sending result to the short message sending interface; the short message sending interface returns a short message sending result to the service invocation layer; the service invocation layer returns a short message sending result to the Web application through the HTTP server; the Web application refreshes the Web page content according to the short message sending result.

811: The Web application sends the refreshed Web page content to the host, and the host displays the short message sending result.

The detail process that the Web application sends the refreshed Web page content to the host, and the host displays the short message sending result is similar to that of steps 710A to 715A, and is not repeatedly described here.

The following describes a specific implementation process of step 405 with reference to a specific structure of the Web framework.

1001: After a user opens a Web framework page by using an Internet browser, the user clicks a button corresponding to Dial-up, and the Internet browser obtains a management command that indicates to provide a dial-up page, where the management command indicates that a dial-up page needs to be provided for the user to enter dial-up information and implement dial-up access. The Internet browser encapsulates the management command into a data packet in an HTTP format, and sends the data packet to a TCP/IP protocol stack on a host. The TCP/IP protocol stack on the host encapsulates the data packet in the HTTP format, and sends the encapsulated data packet to a data card.

1002: After receiving the data packet, a TCP/IP protocol stack of the data card decapsulates the data packet, determines, according to the destination address of the data packet, that data in the data packet is a management command, and sends the data packet which is obtained through the decapsulation and in the HTTP format to an HTTP server. After decapsulating the data packet, the HTTP server obtains a management command that indicates to provide a dial-up page. The HTTP server searches, according to the management command, the Web application for an html file corresponding to the dial-up page, encapsulates the html file into a data packet in the HTTP format, and sends the data packet to the TCP/IP protocol stack of the data card. The TCP/IP protocol stack of the data card encapsulates the received data packet from the HTTP server, and sends the encapsulated data packet to the host.

1003: The TCP/IP protocol stack on the host decapsulates the data packet from the data card to obtain a data packet in the HTTP format, and sends the data packet to the Internet browser. The Internet browser decapsulates the data packet in the HTTP format to obtain an html file corresponding to the short message sending page, and displays a dial-up page according to the html file.

1004: The user enters the dial-up information on the dial-up page, and clicks the confirm button. The Web application receives a dial-up command.

Specifically, the process that the Web application receives a dial-up command is similar to the foregoing process of receiving a short message sending command, and is not repeatedly described here.

1005: The Web application on the Web framework generates data content according to the dial-up command, and invokes a sending interface that is suitable for sending an HTTP file to send the HTTP file to the HTTP server.

The HTTP file includes a data header and data content. The data content includes dial-up information, and the data header includes indication information indicating a dial-up service.

1006: After receiving the HTTP file, the HTTP server parses the HTTP file, and sends the indication information indicating the dial-up service and data content to the service invocation layer.

1007: The service invocation layer determines, according to the indication information indicating the dial-up service, that the service to be performed currently is a dial-up service, and invokes a dial-up interface in the service container (Service Container) by using the dial-up information as an input parameter.

1008: The dial-up interface encodes the dial-up information, and invokes a dial-up service provider interface by using an encoding result as an input parameter.

1009: The dial-up service provider interface encapsulates the encoding result to obtain an encapsulation structure supported by the board software, and invokes a dial-up service interface provided by the board software corresponding to a universal dial-up service by using the encapsulation structure as an input parameter.

1010: The dial-up service interface provided by the board software corresponding to the dial-up service dials to request to connect to a network where the data card is already registered.

It should be noted that a Web framework page needs to be opened before step 801 and step 1001. The process of opening the Web framework page includes: The user may enter the address of the data card and a page file (for example, the user enters http://192.168.1.1/index.html) in the Internet browser; the Internet browser encapsulates the content entered by the user, obtain a data packet in the HTTP format, and sends the data packet to the TCP/IP protocol stack on the host; the TCP/IP protocol stack on the host encapsulates the data packet in the HTTP format, and sends the encapsulated data packet to the data card. After receiving the data packet, the TCP/IP protocol stack of the data card decapsulates the data packet, determines, according to the destination address of the data packet, that the data in the data packet is a management command, and sends the data packet which is obtained through the decapsulation and in the HTTP format to the HTTP server. After decapsulating the data packet, the HTTP server searches the Web application for an index.html file, encapsulates the index.html file into a data packet in the HTTP format, and sends the data packet to the TCP/IP protocol stack of the data card. The TCP/IP protocol stack of the received data card encapsulates the data packet from the HTTP server, and sends the encapsulated data packet to the host. The TCP/IP protocol stack on the host decapsulates the data packet from the data card to obtain a data packet in the HTTP format, and sends the data packet to the Internet browser. The Internet browser decapsulates the data packet in the HTTP format to obtain an index.html file corresponding to the short message sending page, and displays a Web framework page according to the index.html file.

Figure 11:
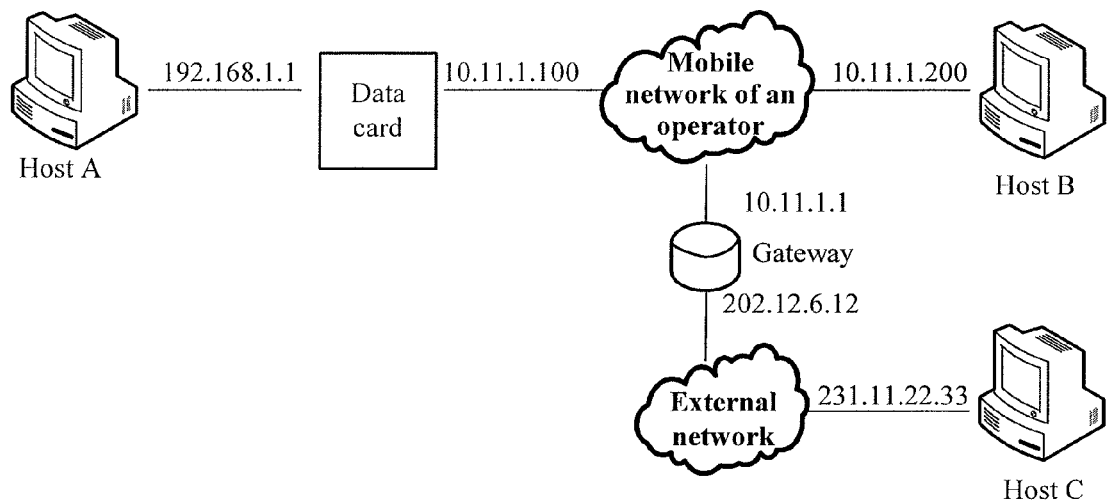
FIG. 11 is a schematic diagram about accessing the Internet by using a data card according to an embodiment of the present invention.

It should be noted that remote management may also be performed by using the foregoing Web framework. As shown in FIG. 11, it is assumed that a host A and a host B are PCs on a mobile network; a host C is a PC on a public network connected to the mobile network; 10.11.1.100 in the figure is an address that the mobile network allocates to a data card after the host A accesses the Internet through dial-up access by using the data card; 192.168.1.1 is the address that the data card allocates to the host A; 10.11.1.200 is the address of the host B; 231.11.22.33 is the address of the host C; 10.11.1.1 is the address that the mobile network allocates to a gateway; 202.12.6.12 is the address that the public network allocates to the gateway; after "http://10.11.1.100" is entered in a browser on the host B, a Web framework page in the data card is opened; then, a remote management task is performed same as the host A uses the data card locally, for example, a short message is sent or dial-up access is implemented remotely. "http://202.12.6.12/port number" is entered in a browser on the host C. An operator configures a mapping relationship between a port number and an intranet address of the mobile network (that is, 10.11.1.100) on the gateway. The gateway opens the Web framework page in the data card according to the mapping relationship. The specific process that the host C accesses 10.11.1.100 is similar to that in the conventional art, and is not repeatedly described here.

Figure 12:
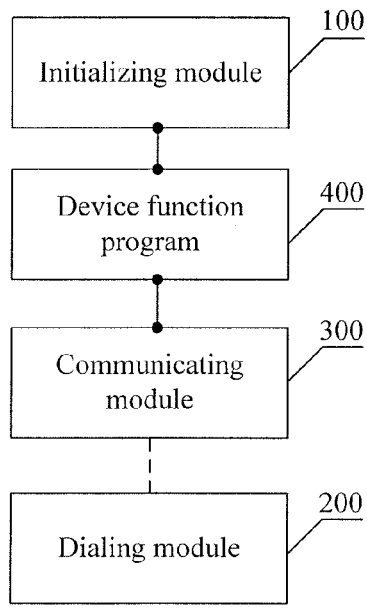
FIG. 12 is a structural diagram of a data card according to an embodiment of the present invention.

Referring to FIG. 12, an embodiment of the present invention provides a data card. The data card includes:

an initializing module 100, configured to: after the data card is connected to a host, report a device descriptor that is compliant with a requirement of a device specification of an Ethernet interface protocol to the host, and configure a parameter of a device function program according to an initialization command that is sent by the host and compliant with the Ethernet interface protocol, so that the device function program is mapped into an Ethernet interface;

a dialing module 200, configured to: obtain dial-up infoii-nation, and dial by using the dial-up information to request to connect to a network;

a communicating module 300, configured to: after the device function program is configured, send data which is sent by the configured device function program and is from the host to the connected network, and sends data from the network to the configured device function program; and the configured device function program 400, configured to: send data from the host to the communicating module, and send data from the communicating module to the host.

The communicating module 300 includes a TCP/IP protocol stack 310 and an MBB wireless protocol stack 320.

The TCP/IP protocol stack is configured to: after the device function program is initialized, allocate an address to the host; when data in a data packet sent by the initialized device function program is Internet service data, send a first data packet to the MBB protocol stack by using the address that the TCP/IP protocol stack allocates to the host and an address that the network allocates to the data card, where the first data packet is a data packet whose source address is the address that the network allocates to the data card and the first data packet includes the Internet service data; receive a data packet sent by the MBB wireless protocol stack, and send a second data packet to the initialized device function program, where the source address of the second data packet is the address that the TCP/IP protocol stack allocates to the host and the second data packet includes Internet service data in the data packet sent by the MBB wireless protocol stack.

The configured device function program is configured to: send the address that the TCP/IP protocol stack allocates to the host to the host, send the data packet from the host to the TCP/IP protocol stack, and send the second data packet from the TCP/IP protocol stack to the host.

The MBB wireless protocol stack is configured to: receive the address that the network allocates to the data card, send the address that the network allocates to the data card to the TCP/IP protocol stack, process the data packet from the TCP/IP protocol stack, and send the processed data packet to the network; and process the data packet from the network, and send the processed data packet to the TCP/IP protocol stack.

The dialing module 200 is configured to: when pre-stored dial-up information exists, obtain the pre-stored dial-up information, and dial by using the pre-stored dial-up information to request to connect to the network, where the pre-stored dial-up information is one piece of the following dial-up information: previous dial-up information of a user, dial-up information of an operator, and dial-up information stored in a subscriber identity module card inserted in the data card; when no pre-stored dial-up information exists, dial by using dial-up information entered by the user to request to connect to the network.

According to the embodiment of the present invention, the data card is mapped into the Internet access device by using the Ethernet interface protocol, so that the data card has an Internet access function; the data card with the Internet access function allocates the address to the host, and performs communication between the host and the network by using the address allocated to the host and the address that the network allocates to the data card. In this way, the host may be quickly connected to the network without installing a driver.

Figure 13:
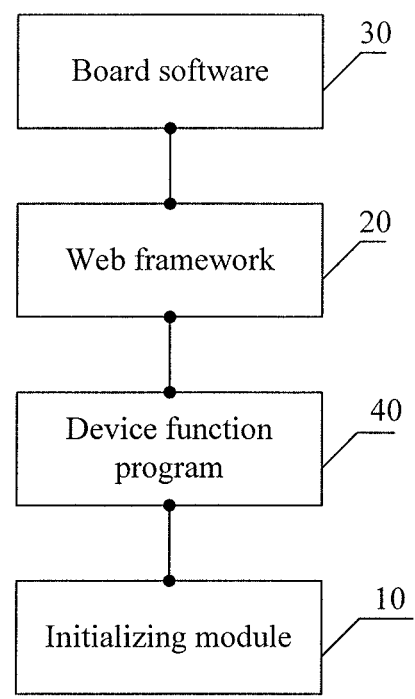
FIG. 13 is a structural diagram of another data card according to an embodiment of the present invention.

Referring to FIG. 13, an embodiment of the present invention provides a data card. The data card includes an initializing module 10, a device function program 40, a Web framework 20, and board software 30.

The initializing module 10 and the device function program 20 have the same structures and functions as the initializing module 100 and the device function program 200 according to the foregoing embodiment, and are not repeatedly described here.

Figure 14:
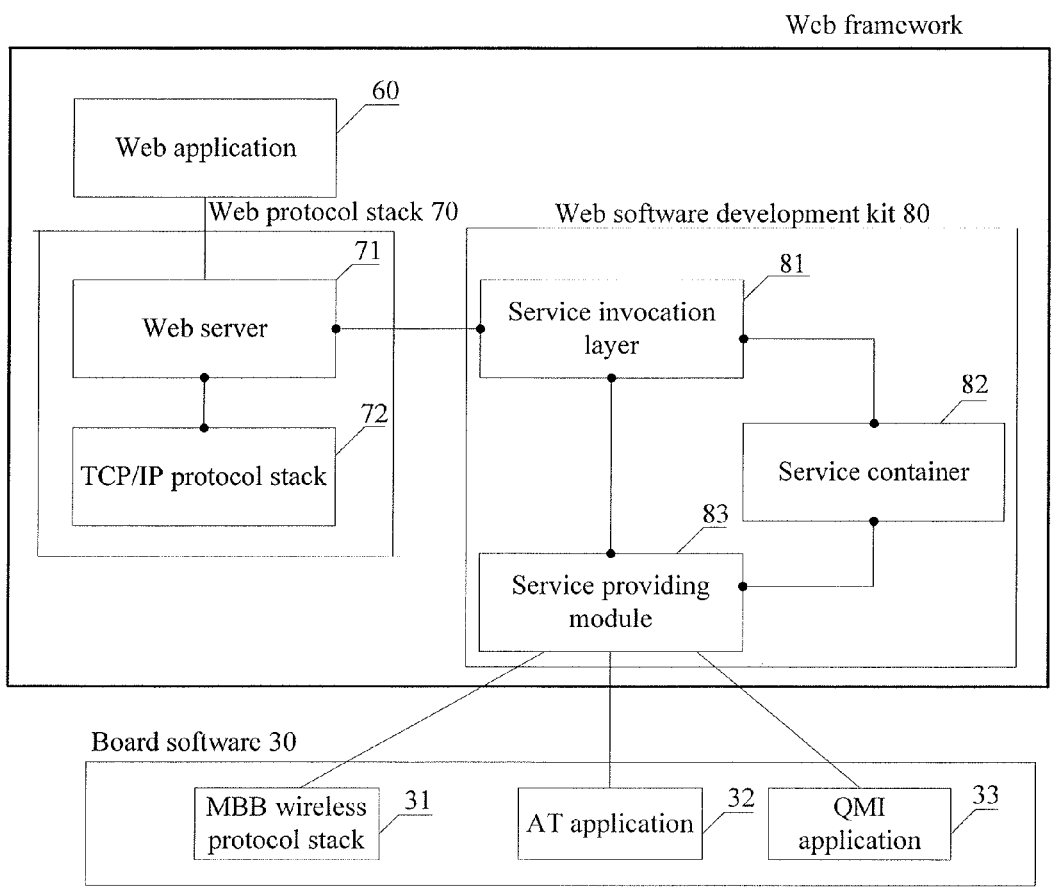
FIG. 14 is a structural diagram of a Web framework according to an embodiment of the present invention.

Specifically, referring to FIG. 14, the Web framework 20 includes a Web application 60, a Web protocol stack 70, and a Web software development kit 80.

The Web application 60 stores Web page content that may exist in an html format. The Web protocol stack 70 includes a Web server 71 and a TCP/IP protocol stack 72. The Web software development kit 80 includes a service invocation layer 81, a service container 81, and a service providing module 83. The service container includes each specific service implementation module, for example, a dialing module and a short message module. The dialing module includes a first dialing module and a dial-up interface. The short message module may include a short message sending interface and a short message receiving interface. The dial-up interface, the short message sending interface, and the short message receiving interface are called service implementation interfaces, which are invoked by the service invocation layer. The service providing module includes multiple service provider interfaces that are invoked by the service implementation interfaces in the service invocation layer and/or the service implementation module. The service provider interface encapsulates an input parameter according to a command format supported by board software in a data card, and then invokes a service interface provided by the board software to implement a corresponding service.

The following describes a function of each module in the Web framework 20 in detail.

The TCP/IP protocol stack 72 has all the functions of the TCP/IP protocol stack 310 according to the foregoing embodiment, and is not repeatedly described here. In addition, the TCP/IP protocol stack 72 is further configured to: judge whether a destination address of data sent by the initialized device function program is an address of the data card; if the destination address of the data sent by the initialized device function program is not the address of the data card, determine that the data sent by the initialized device function program is Internet service data; if the destination address of the data sent by the initialized device function program is the address of the data card, determine that the data sent by the initialized device function program is a management command; and send the management command to the Web server.

The Web server is configured to: judge whether the management command is a first management command or a second management command, where the first management command is a management command used to indicate that a preset Web page content needs to be provided, and the second management command is a management command used to indicate that a specific service needs to be implemented; if the management command is the second management command, send the second management command to the Web application module; if the management command is the first management command, search, according to the first management command, the Web application module for Web page content corresponding to the first management command, and send the found Web page content to the TCP/IP protocol stack. Subsequently, the TCP/IP protocol stack encapsulates the Web page content, and sends the encapsulated content to the host, and an Internet browser on the host displays the Web page content.

The Web application module is configured to: generate data content according to the second management command; invoke an API interface that is suitable for sending a Web service message package, send a Web service message package to the Web server, where the Web service message package includes a data header and data content, where the data header includes indication information indicating a specific service to be implemented.

The Web server is further configured to: parse the Web service message package, and send the data content and the indication information to the service invocation layer in the Web software development kit.

The service invocation layer is configured to: invoke, according to the indication information, the service provider interface or the service implementation interface by using a parameter in the data content as an input parameter, where the parameter in the data content includes information entered by the user and the service provider interface or the service implementation interface belong to the API interface.

The service implementation interface is configured to: encode the parameter in the data content, determine a service provider interface that needs to be invoked, and invoke the service provider interface by using an encoding result as an input parameter. For example, if the management command indicates that a short message is sent to a phone number, the service provider interface is a short message sending interface.

The service provider interface is configured to: encapsulate the encoding result or the parameter in the data content to obtain an encapsulation structure supported by the board software, and invoke a service interface provided by the board software by using the encapsulation structure as an input parameter. For example, if the management command indicates that a short message is sent to a phone number, the service provider interface may be a short message sending service provider interface. Reference may be made to the corresponding description in the method embodiments as shown in FIG. 8A, FIG. 8B, FIG. 10A and FIG. 10B for the invocation among the service invocation layer, the service implementation interface, and the service provider interface, which is not repeatedly described here.

Specifically, the dialing module includes a first dialing module and/or a dial-up interface. The first dialing module is configured to: when pre-stored dial-up information exists, obtain the pre-stored dial-up information, and invoke a dial-up service provider interface by using the pre-stored dial-up information as an input parameter, where the dial-up service provider interface is used to encapsulate the encoding result to obtain an encapsulation structure supported by the board software and invoke a dial-up service interface provided by the board software corresponding to a dial-up service by using the encapsulation structure as an input parameter; and dial through the dial-up service interface provided by the board software corresponding to the dial-up service so as to request to connect to the network where the data card is already registered. The dial-up interface and the dial-up service provider interface belong to an API interface, and are generally function interfaces. Specifically, similarly to the embodiment as shown in FIG. 4, the first dialing module may first judge whether the first dialing module stores previous dial-up information of a user; if the first dialing module stores the previous dial-up information of the user, the first dialing module invokes the dial-up service provider interface by using the previous dial-up information of the user; if the first dialing module does not store the previous dial-up information of the user, the first dialing module judges whether an operator configuration table stored in the first dialing module has dial-up information; if the operator configuration table has dial-up information, the first dialing module invokes the dial-up service provider interface by using the dial-up information; if the operator configuration table does not have dial-up information, the first dialing module judges whether a subscriber identity module card inserted in the data card has dial-up information; if the subscriber identity module card has dial-up information, the first dialing module invokes the dial-up service provider interface by using the dial-up information; if the subscriber identity module card does not have dial-up information, the first dialing module judges whether an equipment vendor configuration table stored in the first dialing module has dial-up information; if the equipment vendor configuration table has dial-up information, the first dialing module invokes the dial-up service provider interface by using the dial-up information.

Figure 10A:
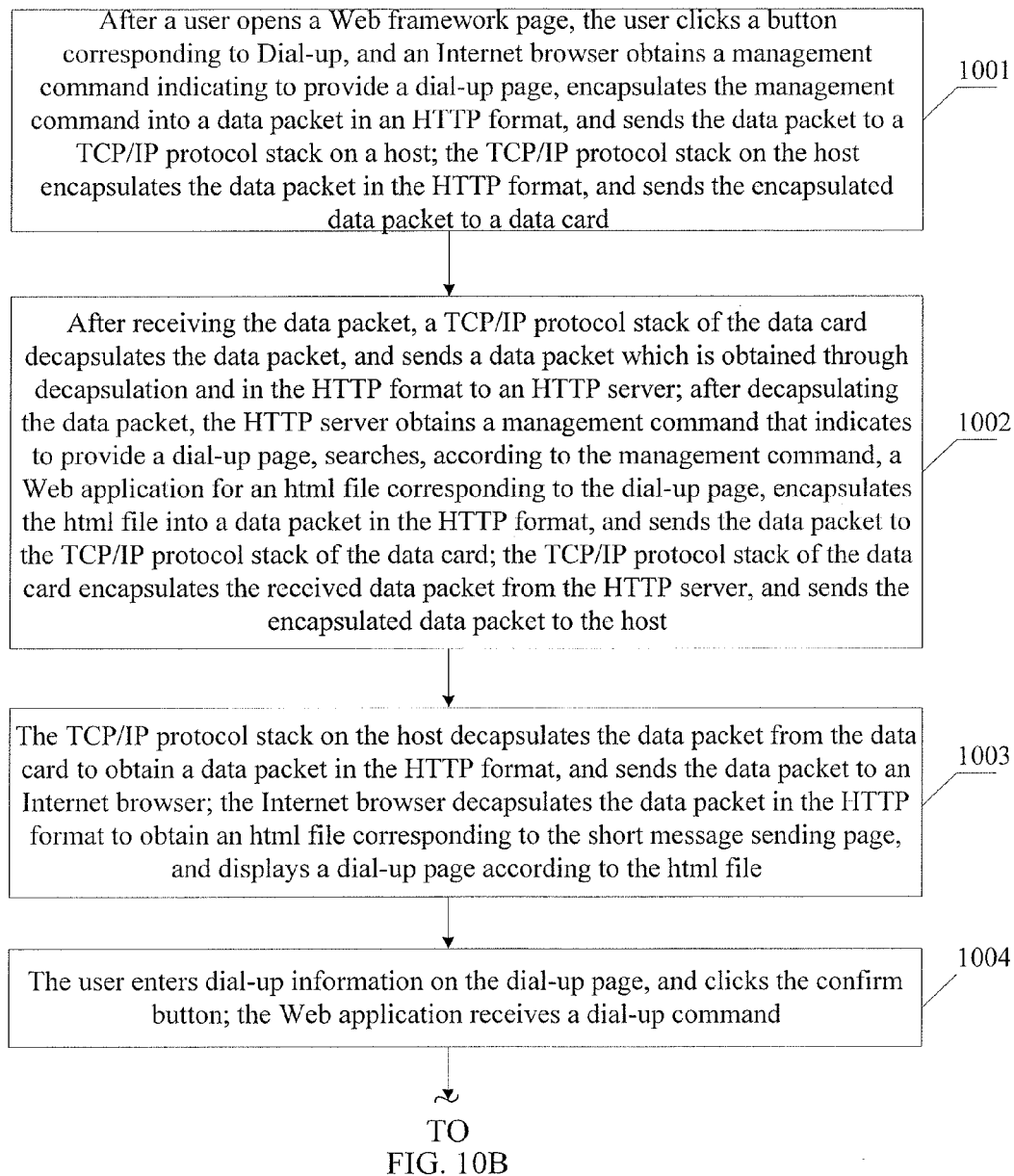
FIG. 10A and FIG. 10B are a flowchart of dial-up access based on a Web framework according to an embodiment of the present invention.
Figure 10B:
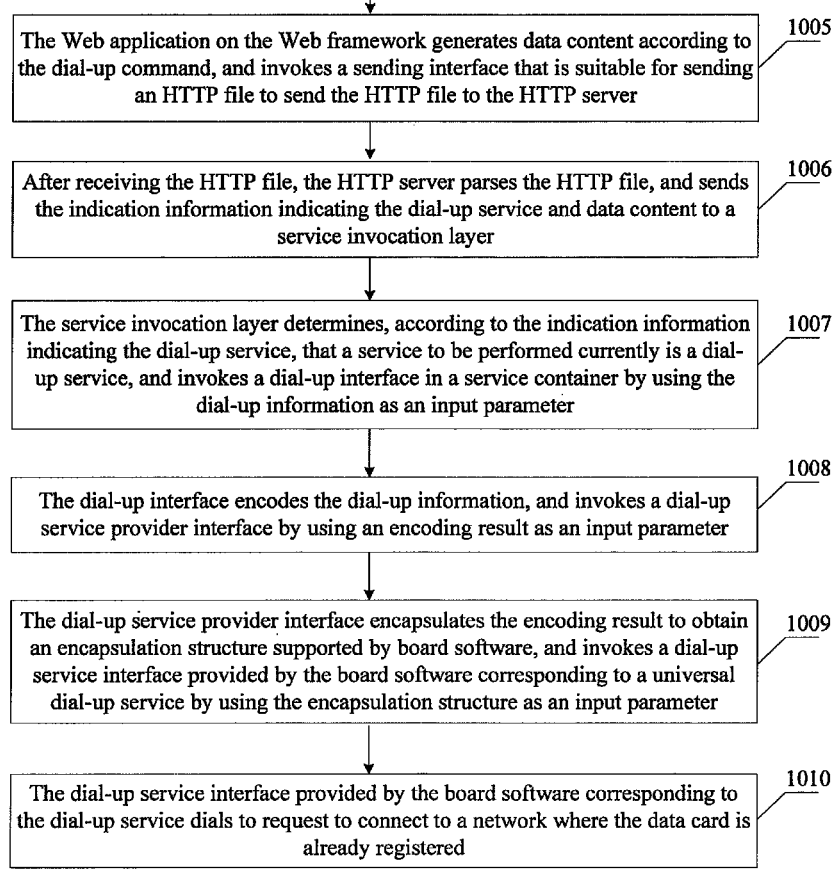

When no pre-stored dial-up information exists, the first dialing module fails to dial up, and the host is not connected to the network. In this case, the user may open a Web framework page through the Internet browser of the host, and click a Dial-up button. Then, the Internet browser may display a dial-up page, where the user enters the dial-up information, and the host sends a management command indicating dial-up access to the data card. At this time, the Web server is configured to: decapsulate a first Web service message package sent by an Internet browser on the host to obtain a management command, and send the management command to the Web application module, where the management command is used to indicate that a dial-up access service is needed and includes dial-up information entered by the user; parse a second Web service message package sent by the Web application module, and send the indication information and data content that are in the second Web service message package to the service invocation layer. The Web application module is configured to: generate data content according to the management command sent by the TCP/IP protocol stack, and invoke an application programming interface (API) that is suitable for sending the second Web service message package to send the second Web service message package to the Web server, where the second Web service message package includes a data header and data content. The data header includes indication information indicating that a dial-up access service is needed. The data content includes dial-up information entered by the user. The service invocation layer is configured to: determine, according to the indication information, that the dial-up access service is needed, and invoke the dial-up interface by using the dial-up information entered by the user as an input parameter. Reference is made to the corresponding description in the embodiment as shown in FIG. 10A and FIG. 10B for the specific dialing process, which is not repeatedly described here.

The board software 30 includes an MBB wireless protocol stack 31 and an AT application 32 and/or a QMI application 33. The AT application 32 and the QMI application 33 include service interfaces provided by the board software, for example, the short message sending interface and dial-up interface.

It should be noted that the foregoing Web software development kit 80 may further include: an adaptation layer interface (OS Adapter). Because different device platforms may have different operating systems, to normalize software development, the OS adapter encapsulates programming interfaces of different operating systems. In this way, differences between operating systems may not need to be taken into consideration for specific service implementation interfaces in the Web software development kit.

It should be noted that the data card may also include client software. In this way, after the data card is mapped into a storage device, the host obtains the client software from a storage device, and runs the client software. Then, the host performs services such as dial-up access.

According to the embodiments of the present invention, the data card is mapped into the Internet access device by using the Ethernet interface protocol, so that the data card has an Internet access function; the data card with the Internet access function allocates an address to the host, and performs communication between the host and the network by using the address allocated to the host and the address that the network allocates to the data card. In this way, the host may be quickly connected to the network without installing a driver and PC client software. Further, in the conventional art, after the driver and PC client software are installed, the user double-clicks the PC client software to initialize the PC client software so as to provide the user with an operating interface for starting dial-up. This process takes about five to ten seconds, while the dial-up access process also takes five to ten seconds. Therefore, the entire dial-up access process takes 10 to 20 seconds. However, according to the present invention, the dial-up access may be performed by using the pre-stored dial-up information to speed up the network access. Further, because the size of a Web page file is far smaller than that of the PC client software, where the size of the PC client software is 80 M and the size of the Web page file is 5 M, a hardware requirement of the data card is reduced, and a cost is lowered. Further, an OS on the PC mainly may be Windows, MacOS, and Linux, and each type of OS includes multiple sub-versions, for example, the sub-versions of Linux include Ubuntu, Fedora, and Debian. The data card is not only used on the PC but also used in an embedded field. In this case, the OS is more diversified, including various embedded Linux, such as WindowsCE, WindowsMobile, and Android. Almost every type of OS has its own special development platform and programming language, but cannot be used across different platforms. In the conventional art, independent PC client software must be developed on each type of OS, which makes the development of the PC client software more difficult and wastes a lot of human resources and money. According to the embodiments of the present invention, the Web framework is used to replace the PC client software, and may be used in each operating system.

A data card and a method for Internet access of the data card provided by the embodiments of the present invention are described in detail above. Although the principle and implementation of the present invention are described with reference to exemplary embodiments, the embodiments are only intended to help understand the method and core idea of the present invention. Meanwhile, with respect to the implementation and application scope of the present invention, modifications and variations may be made by persons of ordinary skill in the art according to the idea of the present invention. Therefore, the specification shall not be construed as a limitation on the present invention.

What is claimed is:

1. A method for Internet access by a data card, comprising:
after the data card is connected to a host, mapping the data card into an Internet access device by using an Ethernet interface protocol;
when pre-stored dial-up information exists, obtaining such pre-stored dial-up information, and dialing by using the pre-stored dial-up information to request to connect to the network, wherein the pre-stored dial-up information is at least one of the following dial-up information: previous dial-up information of a user, dial-up information of an operator, and dial-up information stored in a subscriber identity module card inserted in the data card, when no pre-stored dial-up information exists, obtaining dial-up information entered by the user on a Web page, and dialing by using the dial-up information entered by the user to request to connect to the network; and
performing, by the Internet access device, communication between the host and the network;
wherein the obtaining dial-up information entered by the user on the Web page, and dialing by using the dial-up information entered by the user to request to connect to the network comprises:
decapsulating, by a Web server in the data card, a first Web service message package sent by an Internet browser on the host, obtaining a management command, and sending the management command to a Web application module, wherein the management command comprises the dial-up information entered by the user and is a command used to operate a data card service and used to indicate that a dial-up access service is needed;
generating, by the Web application module in the data card, data content according to the management command sent by a TCP/IP protocol stack, and invoking an application programming interface (API), which is suitable for sending a second Web service message package to the Web server, wherein the second Web service message package comprises a data header and the data content, wherein the data header comprises indication information indicating that the dial-up access service is needed, and the data content comprises the dial-up information entered by the user;
parsing, by the Web server in the data card, the second Web service message package sent by the Web application module, obtaining the indication information and the data content, and sending the indication information and the data content to a service invocation layer in the data card; and
determining, by the service invocation layer in the data card and according to the indication information, that the dial-up access service is needed and invoking a dial-up interface by using the dial-up information entered by the user as an input parameter;
wherein the dial-up interface is used to encode the dial-up information entered by the user and invoke a dial-up service provider interface by using an encoding result as an input parameter, wherein the dial-up service provider interface is used to encapsulate the encoding result to obtain an encapsulation structure supported by board software and invoke a dial-up service interface provided by the board software corresponding to the dial-up service by using the encapsulation structure as an input parameter.

2. The method according to claim 1, wherein:
the Ethernet interface protocol is an Ethernet Control Model (ECM) protocol or a Remote-Network Device Interface Specification (RNDIS) protocol.

3. The method according to claim 1, wherein:
the mapping the data card into the Internet access device by using the Ethernet interface protocol comprises:
reporting, by the data card, a device descriptor that is compliant with a requirement of a device specification of the Ethernet interface protocol to the host, wherein the device descriptor is used to trigger the host to run an Ethernet interface driver; and receiving, by the data card, an initialization command that is sent by the Ethernet interface driver run on the host and compliant with the Ethernet interface protocol; and performing initialization according to the initialization command, so that the data card is mapped into the Internet access device.

4. The method according to claim 3, wherein:

before the reporting, by the data card, the device descriptor that is compliant with the requirement of the device specification of the Ethernet interface protocol to the host, the method further comprises:

mapping the data card into a storage device, and receiving a mode switching command sent by the host.

5. A data card, comprising:

an initializing module, configured to: after the data card is connected to a host, report to the host a device descriptor that is compliant with a requirement of a device specification of an Ethernet interface protocol, and configure a parameter of a device function program according to an initialization command that is sent by the host and compliant with the Ethernet interface protocol, so that the device function program is mapped into an Ethernet interface;

a dialing module, configured to: obtain dial-up information and dial, by using the dial-up information, to request to connect to a network;

a communicating module, configured to: after the device function program is configured, when data sent by the configured device function program from the host is Internet service data, send the data to the connected network, and send the data from the connected network to the configured device function program; and the configured device function program, configured to: send the data from the host to the communicating module, and send the data from the communicating module to the host;

the communicating module comprises a TCP/IP protocol stack and an MBB wireless protocol stack, wherein:

the TCP/IP protocol stack is configured to: after the device function program is configured, allocate an address to the host; when data sent by the configured device function program is Internet service data, send a first data packet to the MBB protocol stack by using the address that the TCP/IP protocol stack allocates to the host and an address that the network allocates to the data card, wherein the first data packet is a data packet whose source address is the address that the network allocates to the data card and the first data packet comprises the Internet service data; receive a data packet sent by the MBB wireless protocol stack, and send a second data packet to the initialized device function program, wherein the source address of the second data packet is the address that the TCP/IP protocol stack allocates to the host and the second data packet comprises Internet service data in the data packet sent by the MBB wireless protocol stack; and the MBB wireless protocol stack is configured to: receive the address that the network allocates to the data card, send the address that the network allocates to the data card to the TCP/IP protocol stack, process the data packet from the TCP/IP protocol stack, and send the processed data packet to the network; and process the data packet from the network, and send the processed data packet to the TCP/IP protocol stack.

6. The data card according to claim 5, wherein:

the Ethernet interface protocol is an Ethernet Control Model (ECM) protocol or a Remote-Network Device Interface Specification (RNDIS) protocol.

7. The data card according to claim 5, wherein:

the initializing module is further configured to receive a mode switching command sent by the host after the data card is mapped into a storage device, wherein the mode switching command is used to trigger the initializing module to report a device descriptor that is compliant with a requirement of a device specification of the Ethernet interface protocol to the host.

8. The data card according to claim 5, wherein:

the dialing module is configured to: when pre-stored dial-up information exists, obtain the pre-stored dial-up information, and dial by using the pre-stored dial-up information to request to connect to the network, wherein the pre-stored dial-up information is at least one of the following dial-up information: previous dial-up information of a user, dial-up information of an operator, and dial-up information stored in a subscriber identity module card inserted in the data card; or when no pre-stored dial-up information exists, dial by using dial-up information entered by the user to request to connect to the network.

9. The data card according to claim 8, wherein the dialing module further comprises a first dialing module and a dial-up interface, wherein:

the first dialing module is configured to: obtain the dial-up information, and invoke the dial-up interface by using the dial-up information as the input parameter; and the dial-up interface is configured to: encode the dial-up information and invoke a dial-up service provider interface by using an encoding result as an input parameter, wherein the dial-up service provider interface is configured to encapsulate the encoding result to obtain an encapsulation structure supported by board software and invoke the dial-up service interface provided by the board software corresponding to the dial-up service by using the encapsulation structure as the input parameter.

10. The data card according to claim 9, wherein:

the data card further comprises:

a Web server, configured to: decapsulate a first Web service message package sent by an Internet browser on the host, obtain a management command, and send the management command to a Web application module, wherein the management command is used to indicate that a dial-up access service is needed and comprises the dial-up information entered by the user; parse a second Web service message package sent by the Web application module, and send indication information and data content that are in the second Web service message package to a service invocation layer;

the Web application module, configured to: generate the data content according to the management command sent by a TCP/IP protocol stack and invoke an application programming interface (API) that is suitable for sending the second Web service message package to the Web server, wherein the second Web service message package comprises a data header and the data content, wherein the data header comprises the indication information indicating that the dial-up access service is needed and the data content comprises the dial-up information entered by the user; and the service invocation layer, configured to: according to the indication information, determine that the dial-up access service is needed, and invoke the dial-up interface by using the dial-up information entered by the user as an input parameter.

* * * * *